US007708192B2

(12) United States Patent
Yokoi et al.

(10) Patent No.: US 7,708,192 B2
(45) Date of Patent: May 4, 2010

(54) BILL DEPOSITING/WITHDRAWING APPARATUS AND METHOD OF CONTROLLING THE SAME

(75) Inventors: Toshinori Yokoi, Owariasahi (JP); Riichi Kato, Nagoya (JP); Minoru Kadowaki, Toyota (JP); Shinji Shibata, Nagoya (JP); Junji Fujita, Nagoya (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 0 days.

(21) Appl. No.: 11/943,642

(22) Filed: Nov. 21, 2007

(65) Prior Publication Data

US 2008/0142583 A1 Jun. 19, 2008

(30) Foreign Application Priority Data

Nov. 24, 2006 (JP) .............................. 2006-316748

(51) Int. Cl.
*G06F 17/00* (2006.01)

(52) U.S. Cl. .............................. 235/379; 902/9; 902/15

(58) Field of Classification Search ................. 235/379; 902/16; 209/534

See application file for complete search history.

(56) References Cited

U.S. PATENT DOCUMENTS 4,625,870 A * 12/1986 Nao et al. ................... 209/534
4,980,543 A * 12/1990 Hara et al. .................. 235/379
6,398,108 B1 * 6/2002 Swinton et al. ............. 235/379
7,240,829 B2 * 7/2007 Graef et al. ................ 235/379
7,472,781 B2 * 1/2009 Yoshioka .................... 194/350
2004/0145106 A1 * 7/2004 Graef et al. ................ 271/9.01
2007/0034683 A1 * 2/2007 Eastman et al. ............ 235/379

FOREIGN PATENT DOCUMENTS

| | | |
|---|---|---|
| EP | 0 471 300 | 2/1992 |
| EP | 1 363 251 | 11/2003 |
| GB | 2 219 120 | 11/1989 |
| JP | 9-208134 | 8/1997 |
| JP | 10-181928 | 7/1998 |
| JP | 2000-331214 | 11/2000 |

* cited by examiner

*Primary Examiner*—Michael G Lee
*Assistant Examiner*—Tabitha Chedekel
(74) *Attorney, Agent, or Firm*—Antonelli, Terry, Stout & Kraus, LLP.

(57) ABSTRACT

A bill depositing/withdrawing apparatus having a cash slot for charging/discharging a bill or bills, comprises: a bill storage section provided inwardly of the cash slot in the apparatus to store a bill or bills, and posture changing means that changes the bill storage section to a money depositing/withdrawing posture, in which a bill or bills are received from and paid to a user through the cash slot, and to a feeding/stacking posture, in which a bill or bills are fed into the apparatus and stacked in the bill storage section, and wherein a bill or bills stored in the bill storage section are caused to project toward a user when the money depositing/withdrawing posture is assumed.

19 Claims, 20 Drawing Sheets

BILL DEPOSITING/WITHDRAWING APPARATUS AND METHOD OF CONTROLLING THE SAME

BACKGROUND OF THE INVENTION

The present invention relates to a bill depositing/withdrawing apparatus, which handles, for example, a bill or bills.

Conventionally, a bill depositing/withdrawing apparatus is mounted in an automated transaction machine used in financial institutions, and the like. The bill depositing/withdrawing apparatus comprises a cash slot for allowing a user to deposit/withdraw a bill or bills, a bill discriminator for discrimination of a bill, and a bill conveyance path, which passes the bill discriminator and conveys a bill or bills. Also, the bill depositing/withdrawing apparatus comprises a combination of respective units, such as a temporary stocker for temporarily storing a deposited bill or bills, a deposit box for storing a deposited bill or bills, a withdrawal box, from which a bill or bills for withdrawal are fed, a recycle box for storing and feeding a bill or bills for deposits and withdrawals, a reject box for storing a bill or bills, which are not to be stored in the deposit box and the recycle box, and a bill or bills, which are not to be withdrawn, out of a bill or bills fed from the withdrawal box, and a load/collect box for feeding a bill or bills being supplied to the recycle box and storing a bill or bills collected from the recycle box.

Along with the popularization of automatic transaction machines, there is heightened a need of making such bill depositing/withdrawing apparatus small in size, inexpensive, and convenient in use while ensuring conventional functions and performances.

Also, along with increase in handling foreign bills in the country and in needs for bill depositing/withdrawing apparatus in the foreign countries, there are demanded for bill depositing/withdrawing apparatus capable of handling not only Japanese yen bills but also foreign bills.

Also, there are demanded bill depositing/withdrawing apparatus highly adapted to general purpose and capable of meeting various needs such as kinds of bills as handled, an arrangement of a cash slot related to an operation by a user, front and rear surface operations related to an operation by a person in charge, etc.

Various constructions have been proposed for, in particular, the cash slot of a bill depositing/withdrawing apparatus, which involves the above-mentioned needs.

For example, there is proposed a bill processing machine, in which a cash slot is arranged on a vertical surface on the front thereof and a storage unit is arranged so that a bill or bills are charged/discharged horizontally from the cash slot (see JP-A-10-181928). The storage unit of the bill processing machine is in the form of a drum capable of rotation and rotates to predetermined positions according to a feeding operation of a charged bill or bills and a stacking operation of a discharged bill or bills. Thereby, a cash slot (bill slot) in a horizontal direction is realized.

Also, there is proposed a bill processing device, in which a cash slot is arranged on a horizontal surface on the front of the device and a storage unit is arranged so that a bill or bills are charged/discharged vertically from the cash slot (see JP-A-9-208134). The storage unit of the bill processing device is constructed to enable rotation and rotates to predetermined positions in a feeding operation of a charged bill or bills and a stacking operation of a discharged bill or bills. Thereby, a cash slot (bill slot) in a vertical direction is realized.

Also, there is proposed a bill handling device, in which a bill storage unit in a cash slot is constructed to be capable of rotate, thus enabling accommodating to a money deposit position being either a substantially horizontal position or a substantially vertical position (see JP-A-2000-331214). Thereby, the bill handling device can be mounted on either an housing, in which a cash slot (bill slot) is arranged on a substantially vertical surface, or an housing, in which a cash slot is arranged on a substantially horizontal surface.

On the other hand, since these types of devices operate all day in an unmanned state in an automatic machine corner of a financial institution, a high reliability is demanded of cash depositing/withdrawing transaction by a user. For example, in a deposit transaction, a user charges a bill or bills, which are folded or torn, into a cash slot, in some cases. When fed into the device, such bill or bills are sometimes skewed much or torn to cause jam generated on a bill conveyance path according to a state of conveyance.

Further, with a device, which can also handle foreign bills, kinds of bills are not only increased as compared with Japanese yen bills but also bills are frequently and greatly different in size in longitudinal and transverse directions according to kinds of bills. Therefore, there is a possibility that a large number of bills charged into a cash slot are aligned very randomly. Also, in terms of situations of bill circulation in respective countries, some foreign bills are sometimes in a worse state than that of Japanese yen bills with respect to degree of fold and tear.

With the cash slot, which affords depositing/withdrawing of a bill or bills horizontally, as in the JP-A-10-181928 described above, however, ends of bills cannot be aligned due to gravity when bills are charged. Therefore, bills in an unevenly aligned state are frequently taken into the device, which sometimes causes jam in conveyance, and thus reduction in bill jam at the time of feeding presents an important problem.

Also, the cash slot, through which a bill or bills are permitted to be charged in a vertical direction, as in JP-A-9-208134 includes many portions positioned in dead spaces as seen from a user. Therefore, in some cases, a bill or bills, such foreign bill or bills, which are small in size, are left in the cash slot, so that a subsequent transaction is made impossible. In such case, handling of the device cannot help but be reserved, so that prevention of leaving a bill or bills is an important problem.

Also, with a pocket type cash slot, through which a bill or bills are permitted to be charged, as in JP-A-2000-331214, it is necessary for a user to enter a hand into the cash slot, in which a drive unit is present. Therefore, there is caused a problem that a user is psychologically afraid to insert a hand, and so it is an important task to make a user interface at the cash slot friendly to a user.

SUMMARY OF THE INVENTION

The invention has been thought of in view of the problems described above and has its object to provide a bill depositing/withdrawing device, in which it is possible to change a posture of a bill storage section at the time of money depositing/withdrawing and at the time of feeding and stacking and a user does not feel a fear when charging a bill or bills, or the like, and a method of controlling the bill depositing/withdrawing device, thus improving a user's degree of satisfaction.

A bill depositing/withdrawing apparatus having a cash slot to deposit a bill or bills and to withdraw a bill or bills according to the invention, comprises a bill storage section provided inwardly of the cash slot in the apparatus to store a bill or bills; and posture changing means that changes the bill storage section to a depositing/withdrawing posture in which a bill or bills are deposited and withdrawn by a user through the cash slot, and to a feeding/stacking posture in which a bill or bills are fed into and stacked in the apparatus, and wherein a bill or bills stored in the bill storage section are caused to project toward a user when the depositing/withdrawing posture is assumed.

Also, a method of controlling a bill depositing/withdrawing apparatus having a cash slot to deposit a bill or bills and to withdraw a bill or bills according to the invention, comprises the steps of in a deposit processing: permitting bill charging into a bill storage section in a depositing/withdrawing posture in which a bill or bills project outside the apparatus from the cash slot; moving the bill or bills inside the apparatus to take in the same; changing a posture of the bill storage section to a feeding/stacking posture in which the taken bill or bills are fed into and stacked in the apparatus; and feeding the bill or bills into the apparatus from the bill storage section in the feeding/stacking posture, and the steps of in a withdrawal processing: stacking a bill or bills present in the apparatus in the bill storage section in the feeding/stacking posture; changing a posture of the bill storage section from the feeding/stacking posture to the depositing/withdrawing posture; and having a bill or bills projecting outside the apparatus from the cash slot to permit the bill or bills to be taken out.

According to the invention, it is possible to provide a bill depositing/withdrawing apparatus, which can change a posture of a bill storage section at the time of depositing/withdrawing and at the time of feeding/stacking and prevents a user from feeling a fear when charging a bill or bills, and a method of controlling the bill depositing/withdrawing apparatus, thus enabling improving a user's degree of satisfaction.

Other objects, features and advantages of the invention will become apparent from the following description of the embodiments of the invention taken in conjunction with the accompanying drawings.

DESCRIPTION OF THE PREFERRED EMBODIMENT

An embodiment of the invention will be described hereinafter with reference to the drawings.

Figure 1:
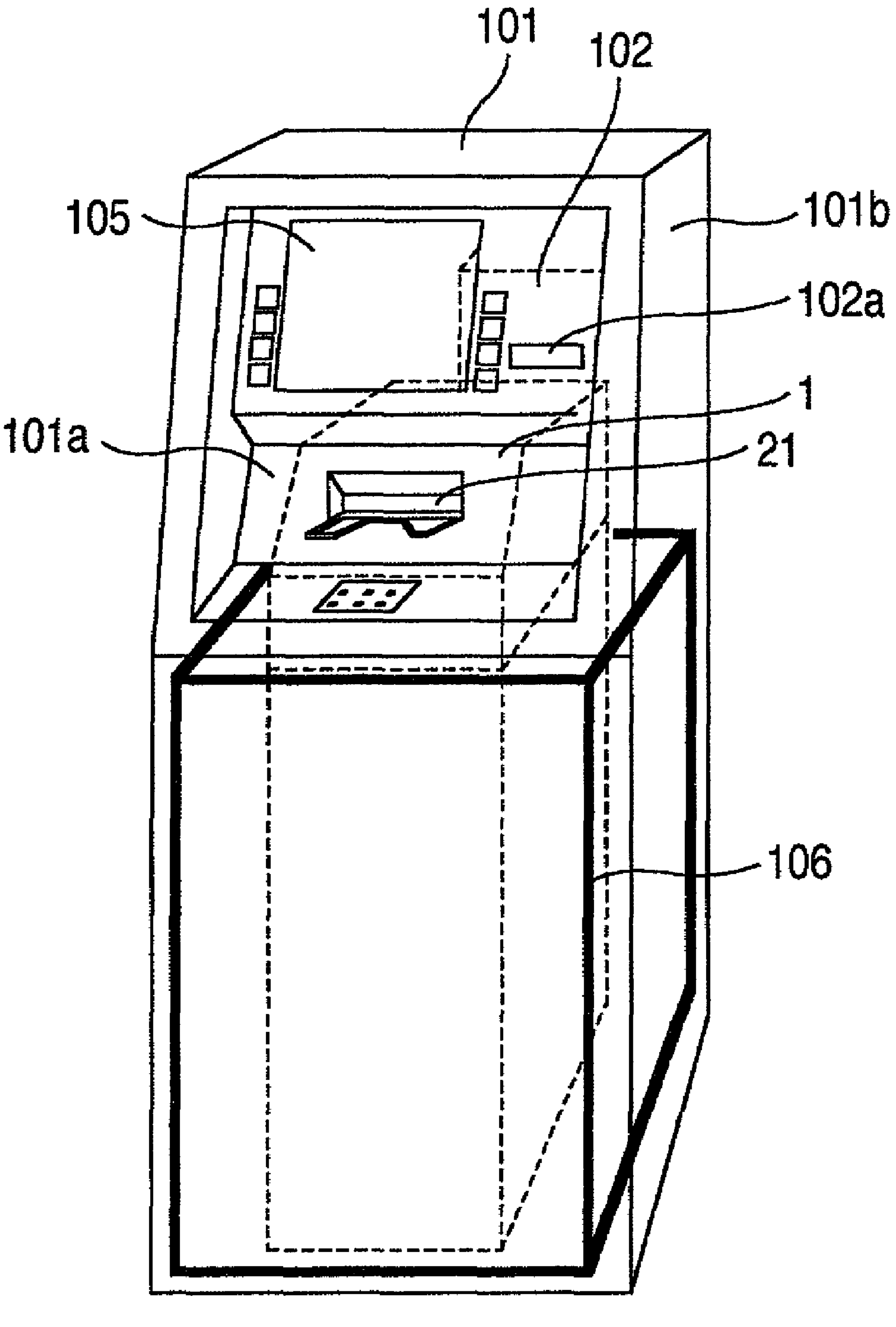
FIG. 1 is a perspective view showing an appearance of an automated transaction machine.

FIG. 1 is a perspective view showing an appearance of an automated transaction machine 101.

The automated transaction machine 101 comprises a housing 101*b*. A customer operating unit 105 is provided in an upper portion of the housing 101*b* and a card/detailed slip processing mechanism 102 is provided on the left. The customer operating unit 105 displays and inputs contents of transaction. The card/detailed slip processing mechanism 102 is communicated with a card slot 102*a* provided on an upper, front plate 101*a* to process a transaction card of a customer to print a detailed slip of transaction to discharge the same.

The upper, front plate 101*a* of the automated transaction machine 101A is provided with a cash slot (bill slot) 21. A bill depositing/withdrawing apparatus 1 for processing bills is provided in the automated transaction machine 101.

A bill storage section disposed below the bill depositing/withdrawing apparatus 1 is enclosed by a cashbox housing 106, which is separate from the housing 101*b* and formed from an iron sheet having a thickness of several tens mm. While the housing 101*b* is also of a rigid housing structure, the cashbox housing 106 is further rigid in structure to increase security. The automated transaction machine 101 can process such transaction as depositing/withdrawing, transfer, etc. by a user with cards, bills, and detailed slips as media.

Figure 2:
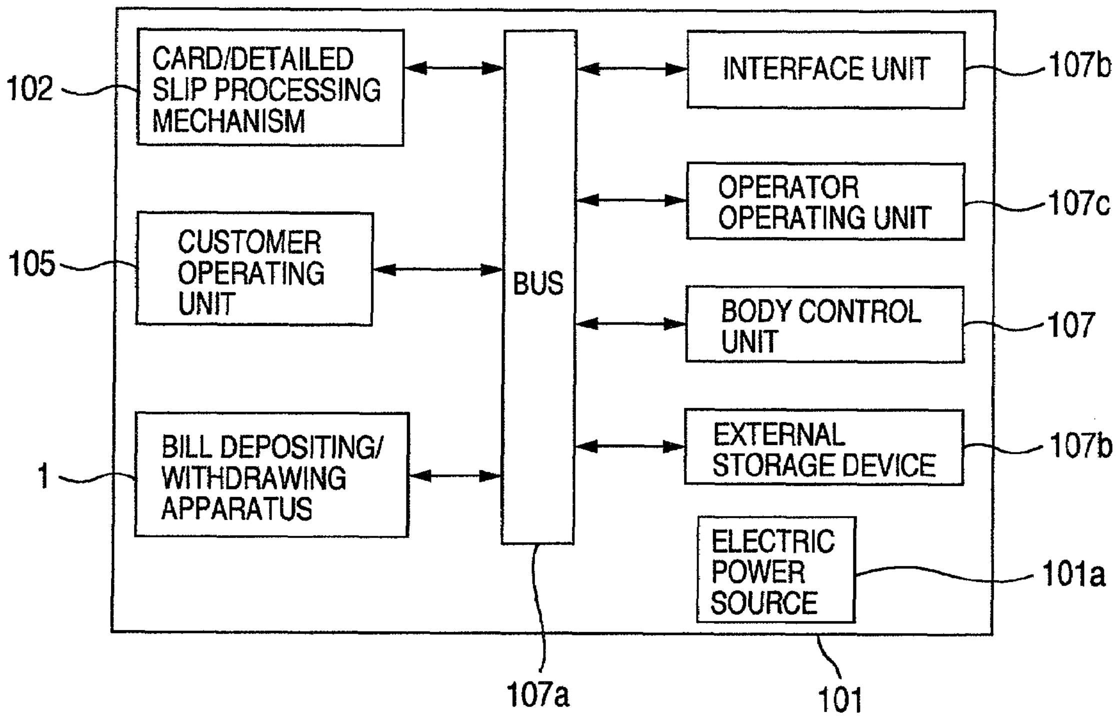
FIG. 2 is a block diagram illustrating control relationship in the automated transaction machine.

FIG. 2 is a control block diagram showing control relationship in the automated transaction machine 101.

The card/detailed slip processing mechanism 102, the bill depositing/withdrawing apparatus 1, and the customer operating unit 105, which are accommodated in the automated transaction machine 101, are connected to a body control unit 107 via a bus 107*a* to perform necessary actions under the control of the body control unit 107. The body control unit 107 is also connected to an interface unit 107*b*, an operator operating unit 107*c*, and an external storage device 107*d* as well as the elements described above via the bus 107*a* to give and take data as required, details of which are omitted because of not being directly related to a feature of the invention. In addition, the reference numeral 101*a* shown in FIG. 2 denotes an electric power source, which supplies electric power to the respective mechanisms and constituents described above.

Figure 3:
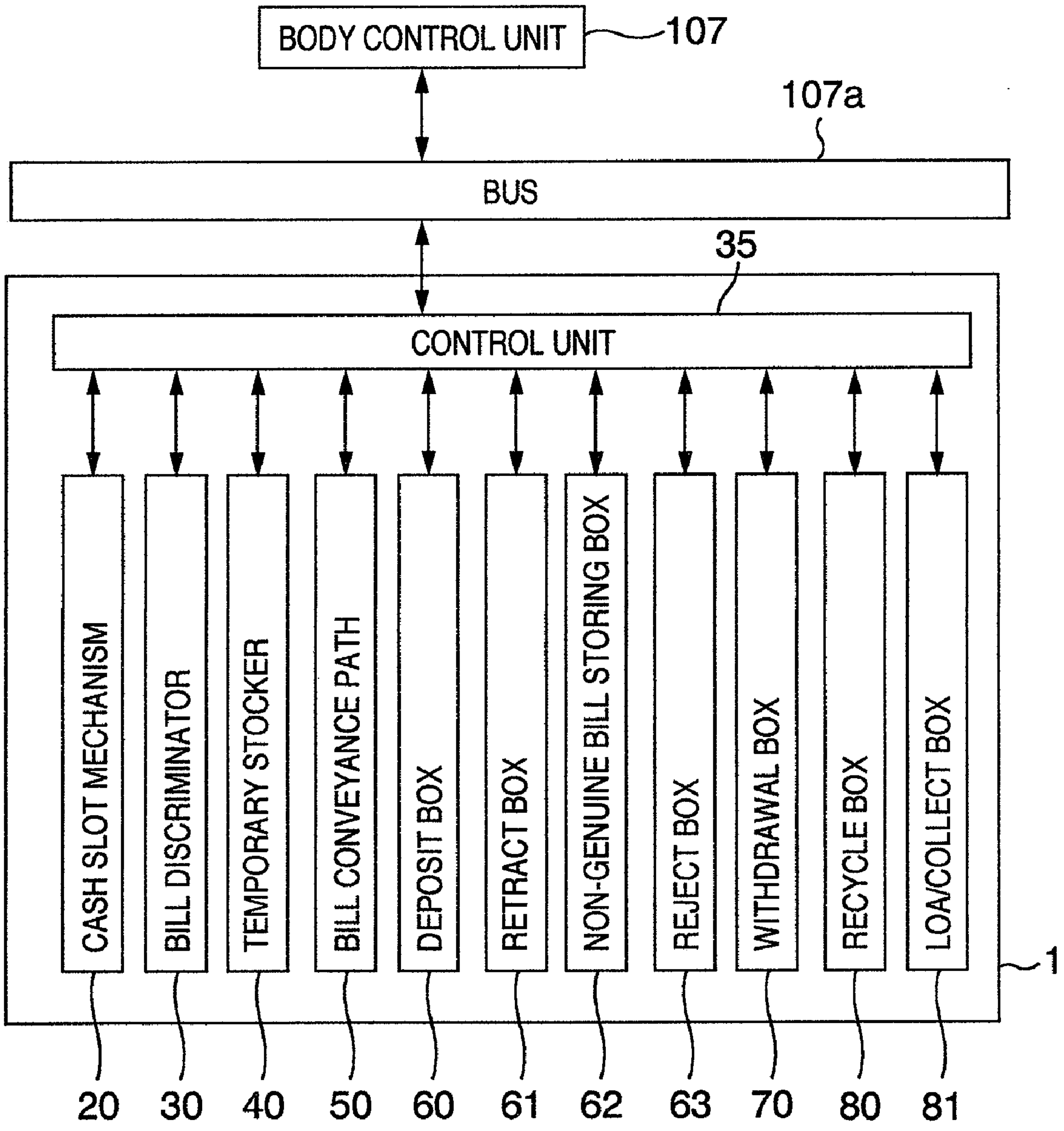
FIG. 3 is a block diagram illustrating control relationship in a bill depositing/withdrawing apparatus.

FIG. 3 is a control block diagram showing control relationship mainly in the bill depositing/withdrawing apparatus 1.

A control unit 35 provided in the bill depositing/withdrawing apparatus 1 is connected to the body control unit 107 of the machine through the bus 107*a*, and controls the bill depositing/withdrawing apparatus 1 in accordance with a command from the body control unit 107 and detection of a state of the bill depositing/withdrawing apparatus 1, and transmits a state of the bill depositing/withdrawing apparatus 1 to the body control unit 107 at need. The control unit is connected to drive motors, electromagnetic solenoids, and sensors for respective units (a cash slot mechanism 20 as a bill storage section, a bill discriminator 30, a temporary stocker 40, a bill conveyance path 50, a deposit box 60, a retract box 61, a non-genuine bill storing box 62, a reject box 63, a withdrawal box 70, a recycle box 80, a load/collect box 81), and drives and controls actuators according to a transaction while monitoring a state thereof by means of sensors.

Figure 4:
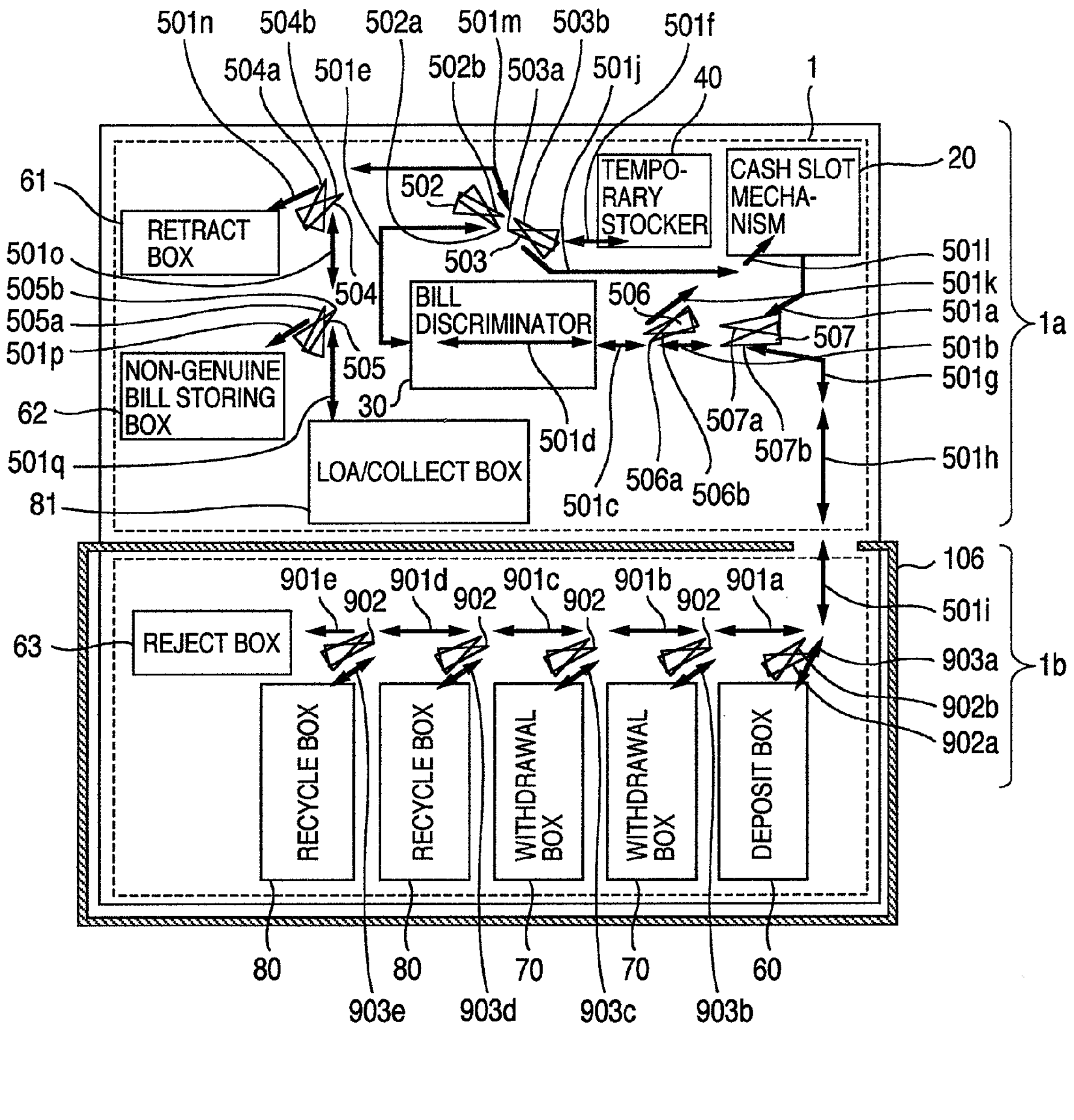
FIG. 4 is a schematic view of construction of a bill conveyance path.

FIG. 4 is a view of the construction of the bill depositing/withdrawing apparatus 1.

The bill depositing/withdrawing apparatus 1 comprises the cash slot mechanism 20, through which a user put-in/takes-out a bill or bills, the bill discriminator 30 for discrimination of a bill, the temporary stocker 40 for temporarily storing a bill or bills as put-in until the transaction is approved, one deposit box 60 for storing a bill or bills, for which transaction is approved, one retract box 61 for recovery of a bill or bills left by a user at the time of deposit and/or at the time of withdrawal, one non-genuine bill storing box 62 for storing a bill or bills as discriminated to be non-genuine, one reject box 63 for storing a bill or bills, which are inappropriate for withdrawal, one withdrawal box 70 for storing a bill or bills for withdrawal, two recycle boxes 80 serving as deposit and withdrawal, the load/collect box 81 for storing a bill or bills supplied to the recycle boxes 80 and a bill or bills recovered from the recycle boxes, the bill conveyance path 50, through which a bill or bills are conveyed via the bill discriminator 30 to the cash slot mechanism 20, the temporary stocker 40, the deposit box 60, the retract box 61, the non-genuine bill storing box 62, the reject box 63, the withdrawal box 70, the recycle boxes 80 and the load/collect box 81, and a control unit (not shown).

Also, the bill depositing/withdrawing apparatus 1 is composed of an upper conveyance mechanism 1*a*, which comprises the cash slot mechanism 20, the bill discriminator 30, the temporary stocker 40, the retract box 61, the non-genuine bill storing box 62, the load/collect box 81 and the bill conveyance path 50, and a lower conveyance mechanism 1*b*, which comprises the deposit box 60, the reject box 63, the withdrawal box 70, the recycle boxes 80, and a conveyance path 90 arranged on upper surfaces of the respective storage boxes to enable opening and closing. Further, the lower conveyance mechanism 1*b* is mounted in the cashbox housing 106, which is formed from an iron sheet having a thickness of about 50 mm, and a conveyance path between the upper conveyance mechanism 1*a* and the lower conveyance mechanism 1*b* is interconnected by connecting conveyance paths 501*h*, 501*i*.

The connecting conveyance path 501*h* is provided in a position to be connected to a conveyance path 501*g* of the upper conveyance mechanism 1*a* on the upper surface of the cashbox housing 106, which encloses the lower conveyance mechanism 1*b*, and the connecting conveyance path 501*i* is provided in a position to be connected to a conveyance path 901*a* of the lower conveyance mechanism 1*b*, and the connecting conveyance path 501*h* and the connecting conveyance path 501*i* are provided in a position to be connected to each other. A slit formed on the upper surface iron sheet of the cashbox housing 106 has a length for passage of a bill and a width corresponding to a width of rollers mounted so as to interpose a bill conveyed to the slit to discharge the same. In case of adopting a construction, in which the lower conveyance mechanism 1*b* is not enclosed by the cashbox housing 106, the slit is not necessarily needed provided that the upper conveyance mechanism 1*a* is placed directly on the lower conveyance mechanism 1*b*. While drive sources (motors) for the conveyance paths may be provided separately for the conveyance path of the upper conveyance mechanism 1*a* and for the conveyance path of the lower conveyance mechanism 1*b*, a single drive source may be used to transmit a driving force with gears provided among the conveyance paths 501*g*-501*h*-501*i*-901*a*.

Also, the bill conveyance path 50 passes through the bill discriminator 30 in dual directions to connect the cash slot mechanism 20, the temporary stocker 40, the deposit box 60, the retract box 61, the non-genuine bill storing box 62, the reject box 63, the withdrawal box 70, the recycle boxes 80 and the load/collect box 81 via the conveyance paths indicated by arrows 501*a* to 501*q* and 901*a* to 901*e*. One-direction arrows out of the respective arrows denote one-direction bill conveyance paths, through which a bill or bills are conveyed in directions of associated arrows, and dual-direction arrows denote dual-direction conveyance paths, through which a bill or bills are switched over to either of associated dual directions every action of transaction.

The bill conveyance path 50 is driven by drive motors (not shown) to switch a direction of rotation of an associated motor every action of transaction. Further, switchover gates 502, 503, 504, 505, 506, 507 and five switchover gates 902 are provided at branch points of the bill conveyance path 50 to switch bill conveyance directions as indicated by characters a, b every action of transaction.

The bill depositing/withdrawing apparatus 1 constructed in the manner described above permits actions of deposit and withdrawal by a user, load/collect actions by a person in charge, and an action of automatic recovery of a bill or bills left by a user.

In an operation of deposit, the bill depositing/withdrawing apparatus 1 separates bills put into the cash slot mechanism 20 one by one, and a kind of and truth or falsehood of a bill is discriminated in the bill discriminator 30. When discrimination is enabled, the switchover gate 503 is switched over to a position 503*a* and a bill is once stored in the temporary stocker 40. When discrimination is not enabled in the bill discriminator 30 and when inclination is abnormal and an interval between bills is abnormal, an associated bill is not taken as a bill, deposit of which is rejected, into the temporary stocker 40 but is stored in the cash slot mechanism 20 with the switchover gate 503 switched over to another position 503*b* and returned to a user.

When transaction is settled, the bill or bills stored in the temporary stocker 40 are forwarded in a reverse order to that at the time of storage and caused to pass the bill discriminator 30 to be stored in an appointed storage box in a state, in which the switchover gate 502 is switched over to a direction indicated by 502*b* and the switchover gate 903 for one of the deposit box 60, the recycle boxes 80 and the reject box 63 is switched over to a direction indicated by 903*b*, thus terminating an action of deposit.

At the time of withdrawal transaction, the bill depositing/withdrawing apparatus 1 discharges a predetermined number of bills from respective ones of the withdrawal boxes 70 and the recycle boxes 80 every kind of bill and causes the bill discriminator 30 to discriminate a kind of each bill to branch the bills at the switchover gate 503 to store the same in the cash slot mechanism 20 to pay the same to a user. At the time of the withdrawal, it is possible to bring about a state, in which a bill or bills project toward a user from the upper, front plate 101*a* of the automated transaction machine 101 as described later.

Also, the bill depositing/withdrawing apparatus 1 enables loading and collecting actions between the load/collect box 81 and the recycle boxes 80 via the bill discriminator 30. The loading action is one, in which a bill or bills being desired to be set every kind are not individually set in the recycle boxes 80 but are set in a lump in the load/collect box 81 by a person in charge and automatically stored in the recycle boxes 80 within the apparatus. The recovering action is one, in which a person in charge does not individually draw out a bill or bills from the respective recycle boxes when the recycle boxes 80 become full, or the like but a predetermined number of bills are automatically collected and stored in the load/collect box 81 from the recycle boxes 80. The collecting action is one, in which a bill or bills are moved in a reverse route to that in the loading action and so details thereof are omitted.

Also, in the case where a user leaves a bill or bills in the cash slot mechanism 20 at the time of deposit transaction and/or at the time of withdrawal transaction, the bill depositing/withdrawing apparatus 1 enables automatically collecting the bill or bills as left. The left bill collecting action is one, in which a bill or bills left in the cash slot mechanism 20 are stored in a lump in the retract box 61.

Subsequently, the construction of the cash slot mechanism 20, which constitutes a main part of the invention, will be described with reference to a configuration of the cash slot mechanism 20 shown in FIGS. 5 to 14.

Figure 5:
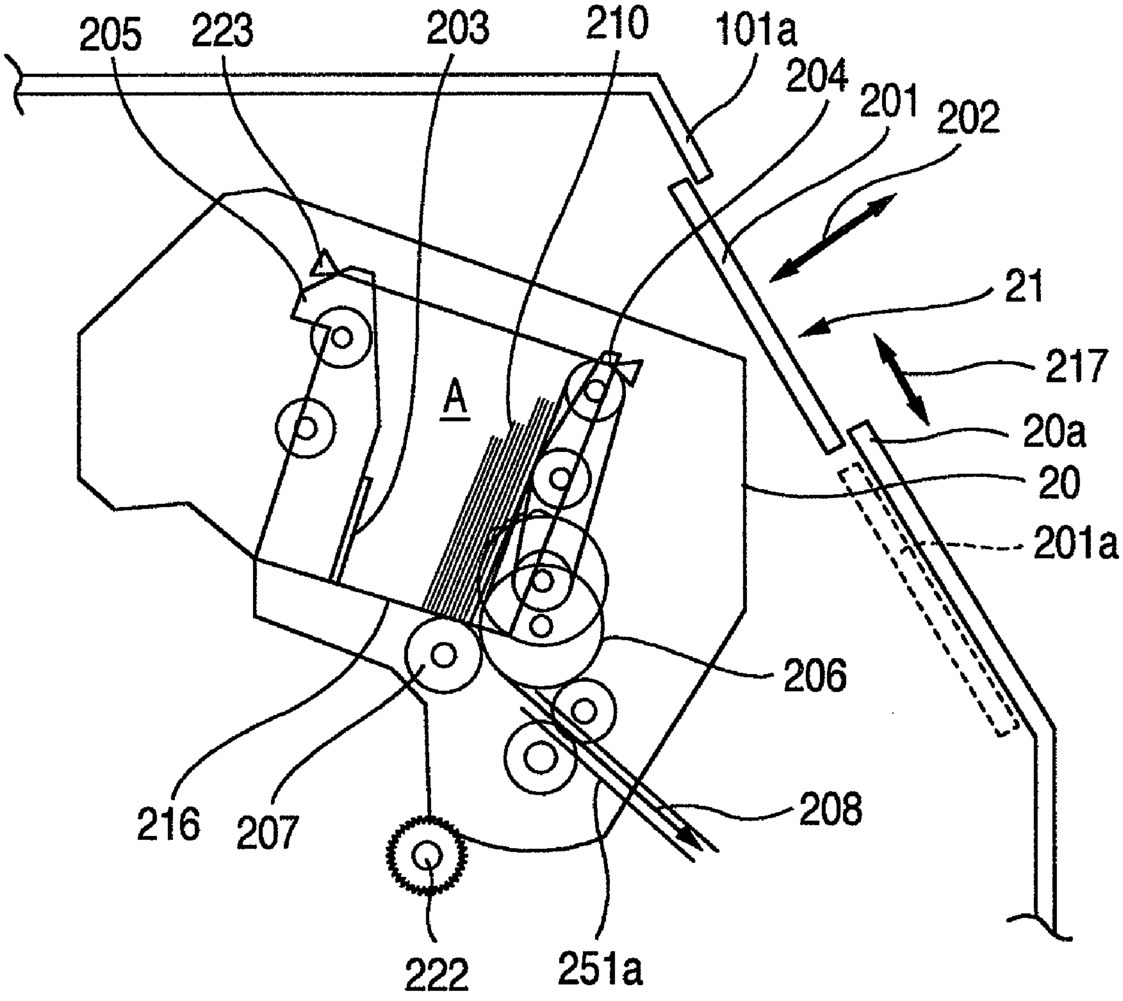
FIG. 5 is a side view of a cash slot mechanism at the time of feeding/stacking.

As shown in FIG. 5, the cash slot mechanism 20 is provided inside the cash slot 21 on the upper, front plate 101*a* provided obliquely on an upper portion of the automated transaction machine 101. The cash slot 21 is provided with an opening 20*a*. The cash slot mechanism 20 is constructed so that a user can charge or take a bill or bills through the opening 20*a* in a depositing/withdrawing direction 202. A housing shutter 201 is provided on the opening 20*a* to slide in an opening and closing direction 217 perpendicular to the depositing/withdrawing direction 202 to provide for opening and closing.

In addition, the housing shutter 201 serves to prevent rain, dust, foreign matters, etc. from entering the machine but is dispensed with in the case where the machine is mounted indoor to be hard to be subjected to environmental influences. Also, when the machine is mounted in a location, which is considerably liable to be subjected to external, environmental influences, a double shutter structure will do, in which shutters are provided respectively on the housing 101*b* of the automated transaction machine 101 and the bill depositing/withdrawing apparatus 1.

As shown in FIG. 5, with the cash slot mechanism 20, a front plate 204 arranged toward a user to constitute the front of the automated transaction machine 101 when being in the feeding/stacking posture (the posture, in which bills 210 in a storage space A are inclined at around 75°±10° to the horizontal), a rear plate (moving plate) 205 arranged on an opposite side to the user, and an intermediate plate 203 arranged between the front plate 204 and the rear plate 205 are arranged in parallel to one another, and a bill hopper 216 is provided to constitute a bottom plate perpendicular to these plates. A space surrounded by these plates forms the storage space A for bills 210. The front plate 204, the rear plate 205 and the intermediate plate 203 are controlled by a drive motor (not shown) in moving in a mutually approaching direction and in a mutually distant direction (referred below to as direction of interposing movement). Also, a length of the front plate 204 from a base thereof (a side, on which the front plate abuts against the bill hopper 216) to a tip end thereof and a length of the rear plate 205 from a base thereof (a side, on which the rear plate abuts against the bill hopper 216) to a tip end thereof are substantially the same as each other, and a length of the intermediate plate 203 from a base thereof (a side, on which the intermediate plate abuts against the bill hopper 216) to a tip end thereof is half the former length. In addition, a length of the intermediate plate 203 is not limited to this but may be set to an appropriate length.

Further, as shown in FIG. 5, a separation mechanism composed of a feed roller 206 and a gate roller 207, which serve as bill feeding means, is arranged below the storage space A toward a user. Therefore, a bill 210 charged into the storage space A is fed into the apparatus owing to a rotary action of the feed roller 206, and the gate roller 207, which does not rotate in a direction of discharge, prevents two bills from being fed at a time. Thus, the bills 210 in the cash slot mechanism 20 are fed in a direction indicated by an arrow 208 to merge into a main bill conveyance path 501 (FIG. 4) via a deposit unit conveyance path 251*a* to be taken into the apparatus. In addition, the feed roller 206 comprises a plurality of rollers having a considerably smaller width than that of the front plate 204 and arranged so as to partially project into the storage space A from slits of the front plate 204, which are provided in a comb-shaped manner.

Figure 6:
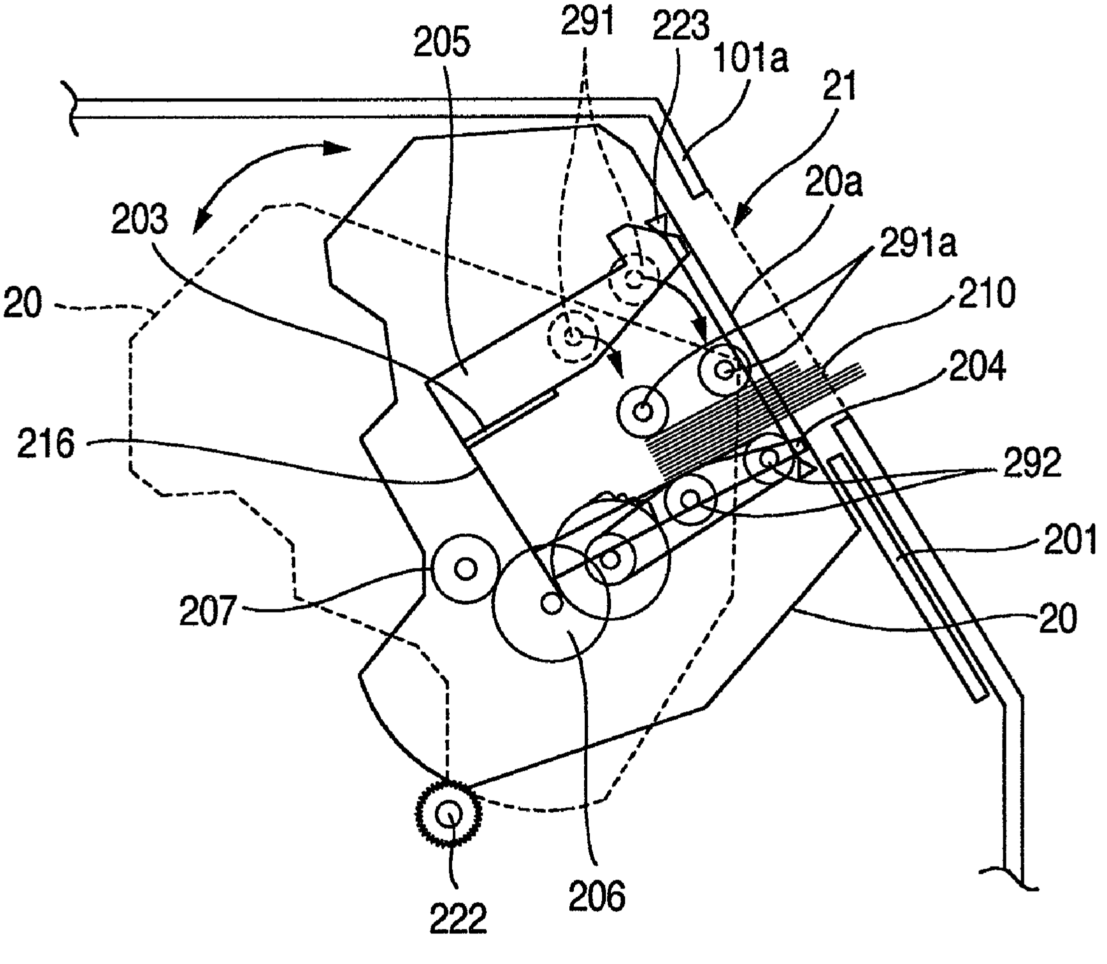
FIG. 6 is a side view of the cash slot mechanism at the time of depositing/withdrawing.

Also, a cash slot mechanism rotating motor 222 serving as posture changing means rotates the cash slot mechanism 20 to a position, in which respective tip ends of the rear plate 205 and the front plate 204 approach upper and lower ends of the opening 20*a*, with a center of rotation of the feed roller 206 as a point of rotation as shown in FIG. 6. FIG. 6 shows a state, in which the depositing/withdrawing posture (the posture, in which the bills 210 in the storage space A are inclined at around 25°±10° to the horizontal) is assumed upon rotation, and in this state, the opening 20*a* and the storage space A are communicated to each other. Accordingly, it is possible to discharge a bill or bills in the storage space A to a user and to allow a user to charge a bill or bills into the storage space A. Here, bills are inclined at around 25°±10° to the horizontal in the depositing/withdrawing posture whereby bills are heightened in visibility for a user and bills as charged are heightened in quality of alignment.

A bill discharge mechanism discharges a bill or bills to a user. The bill discharge mechanism comprises a bundle conveyance mechanism (clamping means), which conveys bills in a bundle, and a pressure applying mechanism, which applies pressure to bills appropriately according to the number of bills.

The bundle conveyance mechanism comprises upper rollers 291 and lower rollers 292, which serve as drive rollers, and a drive unit (not shown). The upper rollers 291 are arranged in a manner to overlap the rear plate 205, slidingly move independently of the rear plate 205 relative to the cash slot mechanism 20 in the same direction as a clamping movement direction of the rear plate 205, and rotate in any position, to which the upper rollers slidingly moved. The lower rollers 292 are arranged in a manner to overlap the front plate 204, are fixed to the cash slot mechanism 20 and rotate at there.

The pressure applying mechanism comprises the upper rollers 291 and the lower rollers 292, which constitute the bundle conveyance mechanism, the front plate 204, the rear plate 205, and a drive unit (not shown).

When a bill or bills are to be discharged to a user, the drive unit (not shown) of the pressure applying mechanism moves the upper rollers 291 in the clamping movement direction to shift the same to a position, in which the upper rollers push down a surface of a bill, that is, a position indicated by 291*a* in FIG. 6. Thereby, the upper rollers 291 and the lower rollers 292 opposed to the upper rollers 291 clamps bills to apply pressure to the same appropriately according to the number of bills. In a state, in which pressure is applied on the bills in this manner, the upper rollers 291 and the lower rollers 292 are rotated by the drive unit (not shown) of the bundle conveyance mechanism to convey bills in bundle toward a user. At this time, bills are fed so that tip ends of a bundle of the bills project toward a user beyond the upper, front plate 101*a*.

Figure 7:
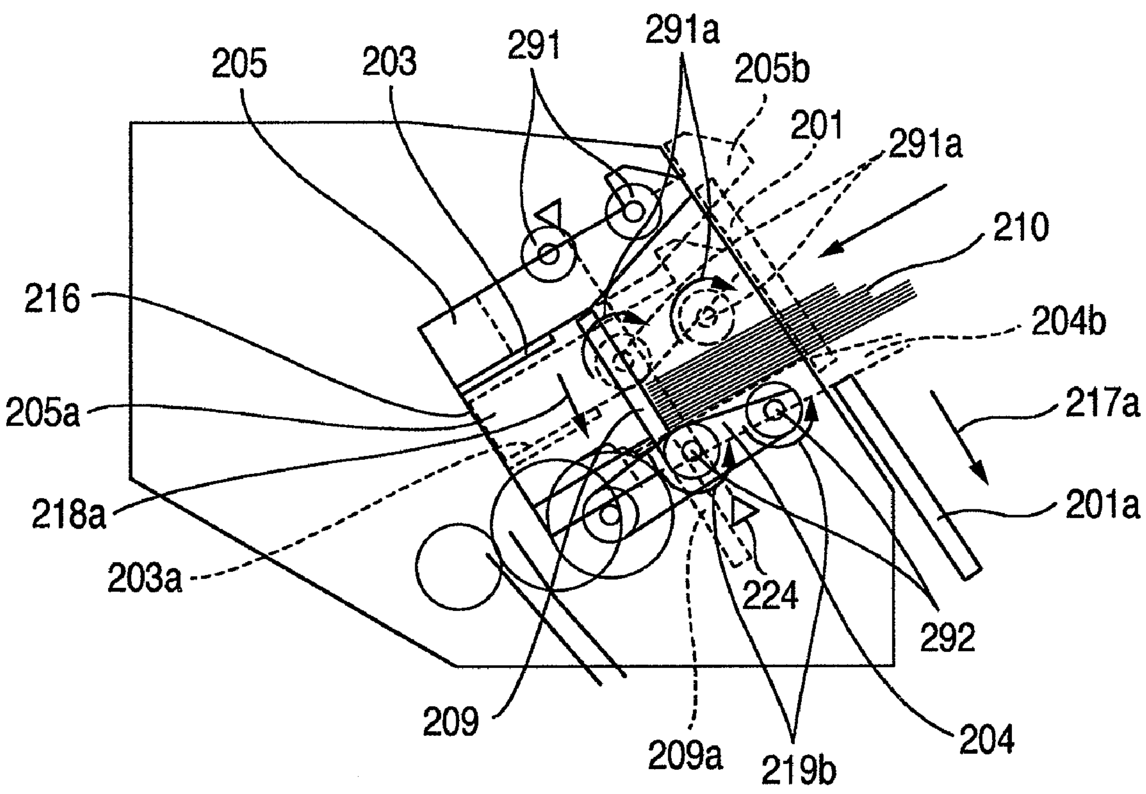
FIG. 7 is a side view of the cash slot mechanism at the time of depositing.

That is, the cash slot mechanism 20 permits a user to operate at a rotating angle of the depositing/withdrawing posture shown in FIG. 6, and discharges bills in the storage space A into the apparatus in the feeding/stacking posture shown in FIG. 7 and performs operation to stack bills in the storage space A from within the apparatus. An explanation will be given according to transaction of deposit, withdrawal, and retract with reference to FIGS. 7 to 13.

At the time of deposit transaction, when a user charges a bill or bills as shown in FIG. 7, the housing shutter 201 is moved to a position 201*a* in a direction of an arrow 217*a* to provide for full opening so that bills 210 are charged between the front plate 204 and the intermediate plate 203 (the intermediate plate 203 is close to the rear plate 205), which are supported in the bill hopper 216. At this time, the front plate 204 and the rear plate 205 are caused to project toward a user beyond the upper, front plate 101*a* and moved to positions indicated by 204*b* and 205*b* in the drawing in a direction of projection in parallel to a depositing/withdrawing direction 202.

In addition, a support plate 209 serving as a stopper is preferably provided around an intermediate position between a bottom of the bill hopper 216 and tip ends of the front plate 204 and the rear plate 205. The support plate 209 can bear end surfaces of bills as charged. Preferably, the support plate 209 is structured to slidingly move as indicated by 209*a* in FIG. 7 in the clamping movement direction or to slidingly move in the depositing/withdrawing direction 202 (see FIG. 5).

Thereby, it is possible to bear end surfaces of bills when bills are charged and to retreat the support plate 209 on other occasions. In particular, the support plate 209 bears end surfaces of bills when the bills are charged whereby a user does not need to insert a hand to within the apparatus but can charge bills outside the apparatus.

Also, with a construction, in which sliding movement is made in the depositing/withdrawing direction 202, the support plate 209 can push out bills in the depositing/withdrawing direction 202 when the bills are to be fed. Preferably, the support plate 209 is mounted not to the cash slot mechanism 20 but to the housing of the bill depositing/withdrawing apparatus 1, or a non-moving part except the cash slot mechanism 20 of the bill depositing/withdrawing apparatus 1. Thereby, it is possible to make use of the support plate 209 independently of the rotating action of the cash slot mechanism 20, thus enabling making the apparatus simple in construction.

When bills are charged as shown in FIG. 7, the rear plate 205, the intermediate plate 203 and the upper rollers 291 are moved to positions 205*a*, 203*a*, 291*a* shown in the drawing, in which they abut against a surface of bills, in the clamping direction indicated by an arrow 218*a* to clamp the bills, and the support plate 209 is moved to a position 209*a* shown in the drawing and outside the cash slot mechanism to rotate the upper rollers 291 and the lower rollers 292, respectively, in directions (opposite directions to directions of projection) of taking-in indicated by 219*a*, 219*b*. Also, the front plate 204 and the rear plate 205 are slidingly moved in the directions of taking-in to be stored in the apparatus.

In addition, a charging detection sensor 224 (FIG. 7) may be provided in the vicinity of the support plate 209 in the storage space A so that operation, in which the rear plate 205, the intermediate plate 203 and the upper rollers 291 are moved in the clamping direction, is performed after the charging detection sensor 224 detects charging of a bill or bills. In this case, since the clamping operation can be performed after it is confirmed that a bill or bills are surely charged to a position of the support plate 209, it is possible to prevent jam in conveyance from being caused due to incomplete charging and the bill depositing/withdrawing apparatus 1 from becoming down correspondingly.

Also, when clamping a bill or bills, pulse counts of motors (excess charging detection means) for moving the rear plate 205, the intermediate plate 203, the upper rollers 291, etc. may be acquired and when the pulse counts are less than a reference value, bills may be determined to be packed excessively and an error message may be displayed on the customer operating unit 105 to provide for returning bills. Thereby, it is possible to prevent jam in conveyance from being caused due to excessive packing of bills.

Figure 8:
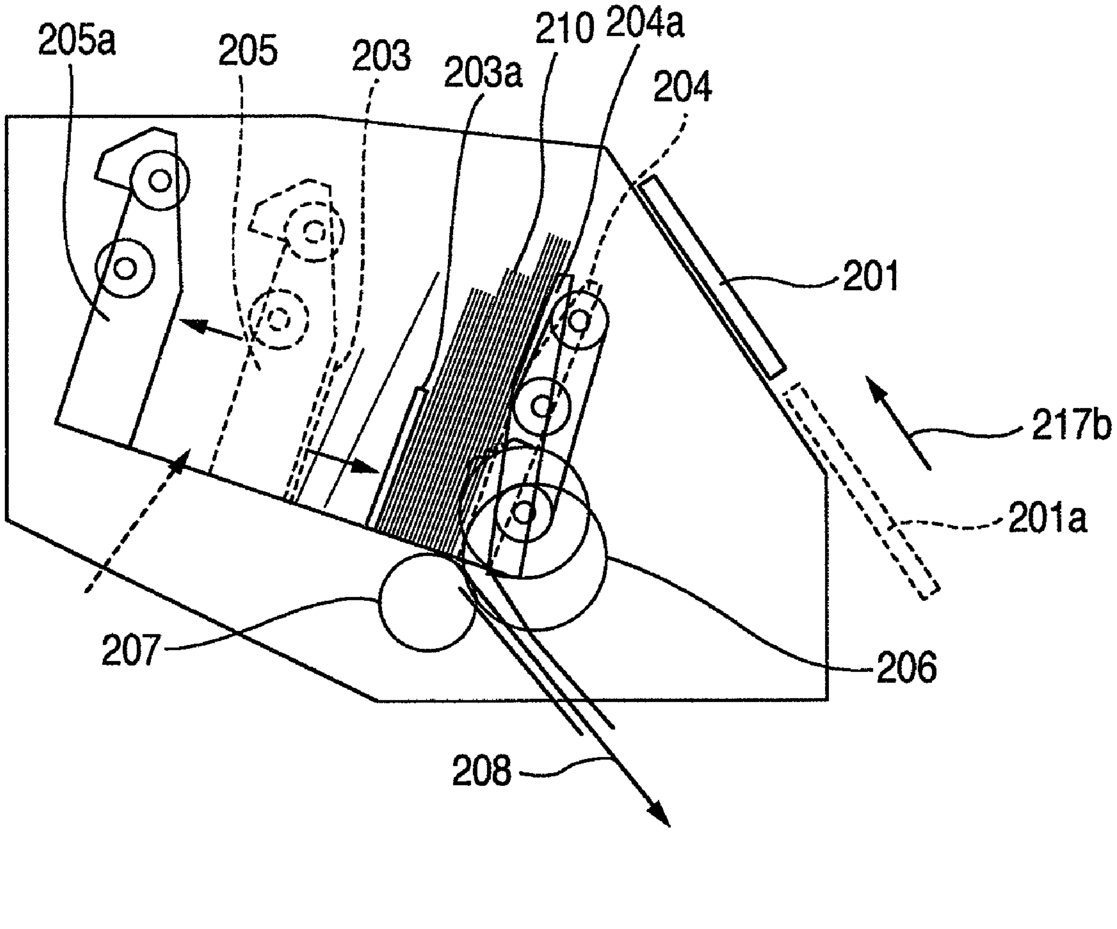
FIG. 8 is a side view of the cash slot mechanism at the time of feeding.

Subsequently, as shown in FIG. 8, at the time of feeding operation of the charged bill or bills, the housing shutter 201 is moved in a direction of an arrow 217*b* to provide for closing. Here, an inlet sensor 223 (see FIG. 13) functioning as a hand detection sensor for detecting a user's hand may be provided so that the housing shutter 201 is closed after it is confirmed that a user separates a hand from the bill or bills. Thereby, it is possible to prevent the housing shutter 201 from being closed in a state, in which a user's hand is present. Also, in order to urge a user to separate a hand from a bill or bills, an operation, in which the bundle conveyance mechanism takes in a bill or bills a little in a direction of retreat to stop, may be repeated after the rear plate 205, the intermediate plate 203 and the upper rollers 291 are moved in the clamping direction to clamp a bill or bills, whereby a bill or bills are intermittently taken in. At this time, the bundle conveyance mechanism functions as an intermittent moving means. Thereby, a user enables use in a psychological sense of security without being given a fear that a bill or bills are suddenly taken in and a hand carrying the bill or bills is pulled into the apparatus.

After the cash slot mechanism 20 is turned and moved at an angle of the feeding/stacking posture shown in FIG. 8, the intermediate plate 203 is moved toward the feed roller 206 to push a bill or bills to turn the front plate 204*a* a little so that a base side of the front plate 204*a* is moved toward the feed roller 206. Also, the lower rollers 292 are moved so that the lower rollers 292 are positioned as a whole on a side over the surface of the front plate 204 as viewed from a bill or bills. Thereby, the intermediate plate 203*a* can push a bill or bills toward the feed roller 206, the rotating action of the feed roller 206 feeds the bill or bills, and the gate roller 207, which does not rotate in the feeding direction, prevents two bills from being fed at a time. Thus, a bill 210 in the cash slot mechanism 20 is fed in the direction indicated by an arrow 208 to merge into the bill conveyance path 50 to be taken into the apparatus.

Also, the rear plate 205 is retreated to the position 205*a* and a bill or bills, which the bill discriminator 30 cannot discriminate at the time of deposit operation, and a bill or bills, of which deposit is rejected due to inclination and an abnormal interval between bills, are conveyed from within the apparatus to be collected between the rear plate 205*a* and the intermediate plate 203*a*. The bill or bills, of which deposit is rejected, are clamped between the rear plate 205 and the front plate 204 in the same manner as at the time of charging, the cash slot mechanism 20 is turned to the depositing/withdrawing posture, and the upper rollers 291 and the lower rollers 292, respectively, shown in FIG. 7 are rotated in reverse directions to directions of the arrows 219*a*, 219*b* to return the bill or bills in a bundle to a user. At this time, the rear plate 205 and the front plate 204 may be pushed outside the upper, front plate 101*a* through the cash slot 21 in the same manner as a bill or bills. As shown in a plan view of FIG. 14, the front plate 204 is formed centrally of a tip end thereof with a recess 199 as viewed from above, the recess 199 enabling a user to grasp a bill or bills directly. Also, the rear plate 205 and the front plate 204 clamp a returning bill or bills from above and under whereby a user is liable to pull out the bill or bills.

Figure 9:
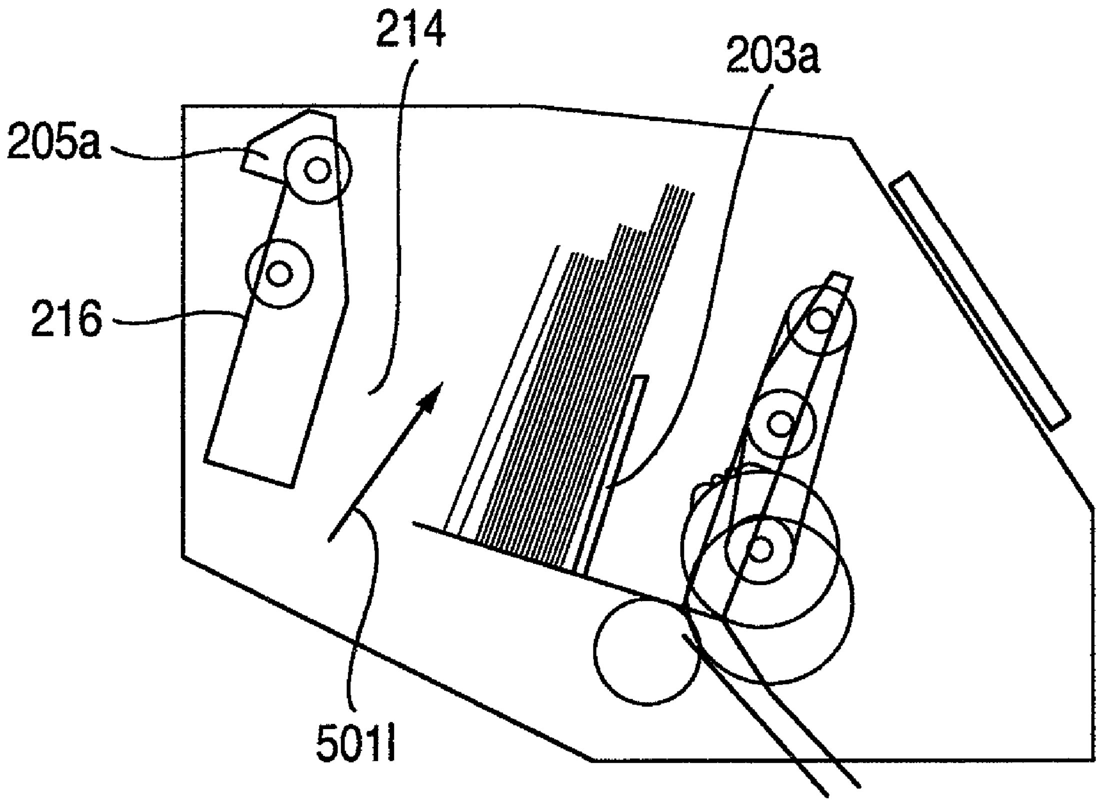
FIG. 9 is a side view of the cash slot mechanism at the time of stacking.

As shown in FIG. 9, at the time of money withdrawal transaction, a bill or bills being paid are conveyed in a direction of an arrow 501*l* (see FIGS. 4 and 9) to pass between guides (not shown) while being exerted by a force of frictional resistance and stacked in a space between the intermediate plate 203*a* and the rear plate 205*a*.

Figure 10:
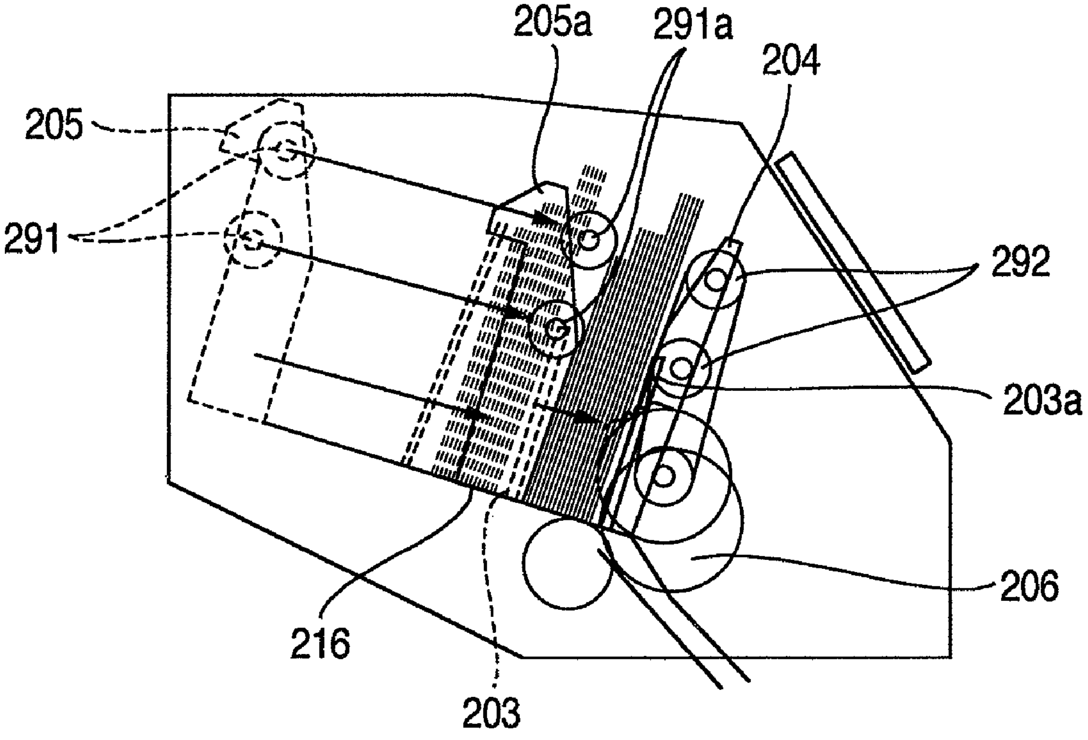
FIG. 10 is a side view of the cash slot mechanism at the time of discharging.
Figure 11:
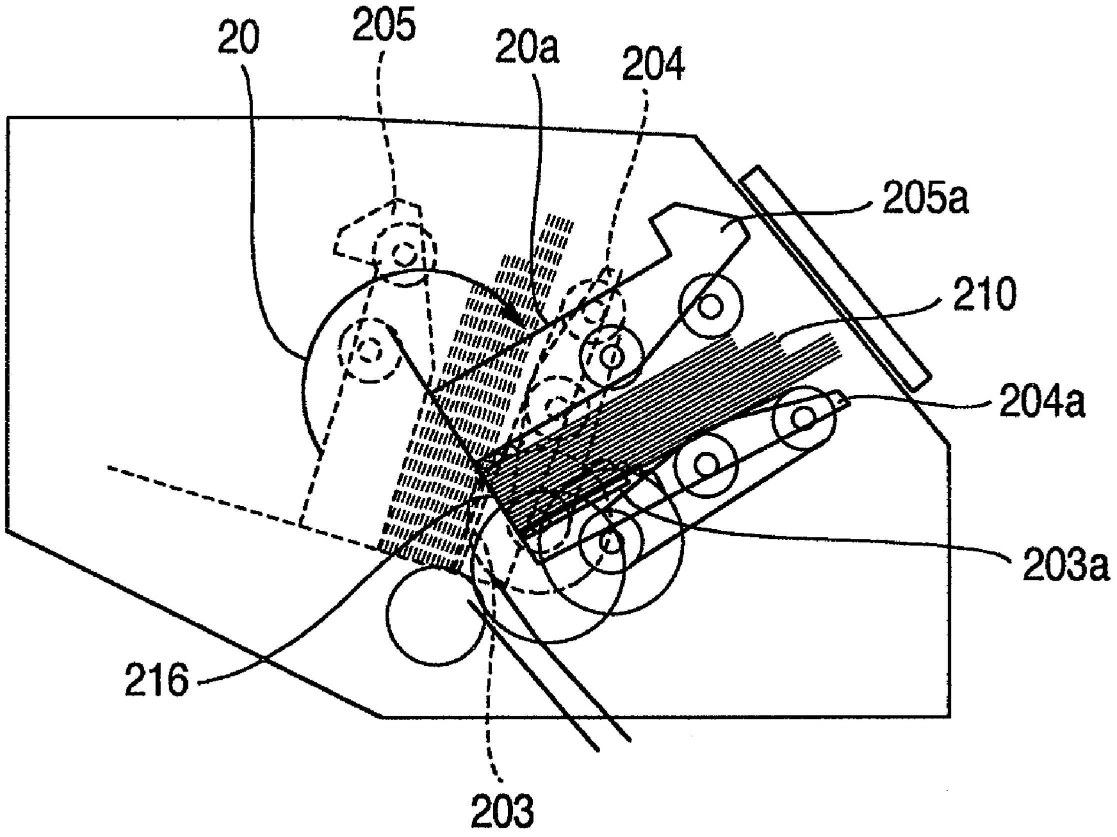
FIG. 11 is a side view of the cash slot mechanism at the time of discharging.

Subsequently, as shown in FIG. 10, a drive unit (not shown) moves the intermediate plate 203 and the rear plate 205, respectively, to the positions 203*a*, 205*a* shown in FIG. 9 to cause the intermediate plate 203*a*, the front plate 204, and the rear plate 205*a* to clamp a bill or bills stored in the cash slot mechanism 20. After the bill or bills are clamped, the cash slot mechanism 20 is turned and moved to the money depositing/withdrawing posture as shown in FIG. 11.

Figure 12:
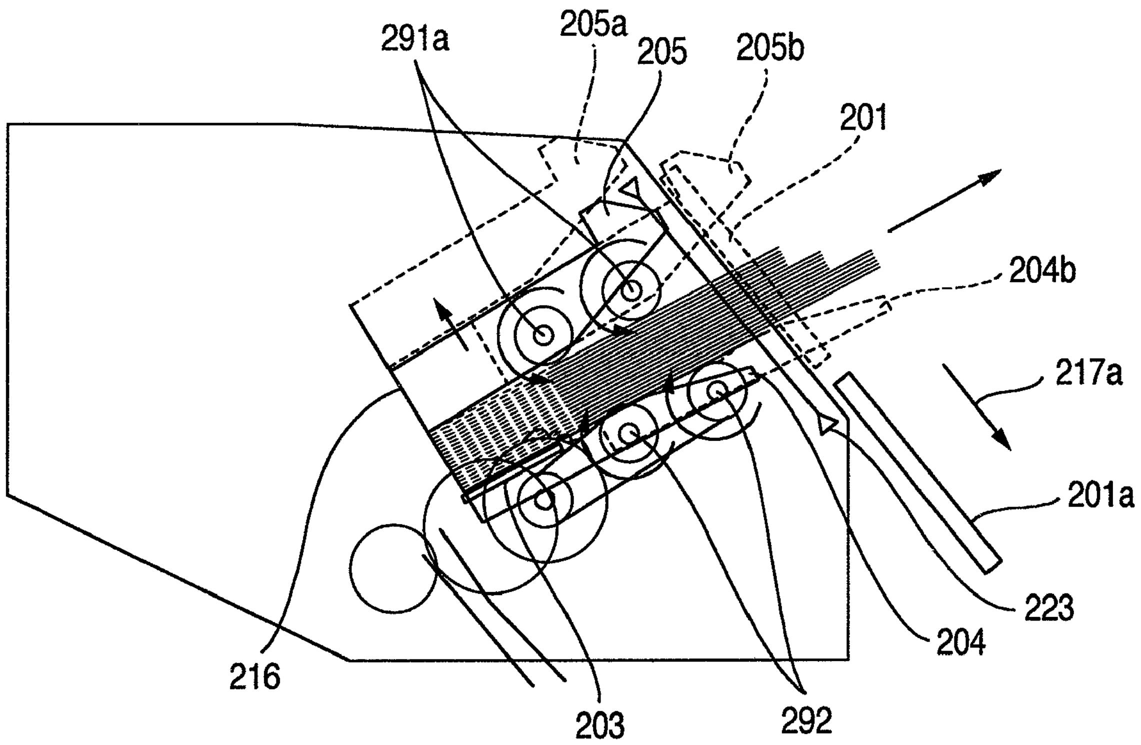
FIG. 12 is a side view showing the cash slot mechanism at the time of discharging.

After the cash slot mechanism 20 is turned, the drive unit (not shown) of the pressure applying mechanism moves the upper rollers 291 to a position, in which a bill or bills are pushed down, that is, the position 291*a* shown in FIG. 12 to cause the lower rollers 292 and the upper rollers 291*a* to clamp the bill or bills. In addition, the upper rollers 291 may be moved to clamp a bill or bills before the cash slot mechanism is turned and moved.

After the bill or bills are clamped, the housing shutter 201 is moved in the direction of the arrow 217*a* as shown in FIG. 12 to open the shutter. After the shutter is opened, the drive unit (not shown) of the bundle conveyance mechanism rotates the upper rollers 291*a* and the lower rollers 292 to discharge the bill or bills to a user through the cash slot 21. At this time, the bill or bills are conveyed to a position, in which the bill or bills project toward a user from the upper, front plate 101*a*.

Also, the rear plate 205 and the front plate 204 are moved toward a user from the upper, front plate 101*a*, that is, to the positions 204*b*, 205*b* shown in FIG. 12 through the cash slot 21. Thereby, a user can take out a bill or bills easily without looking into the cash slot 21.

Also, after the rear plate 205 and the front plate 204 are caused to project, the support plate 209 supports an end of a bill or ends of bills inside the apparatus as shown in FIG. 7. Thereby, a bill or bills are prevented from being erroneously pushed deep into the storage space A. Also, since a user cannot pull out a bill or bills while the bill or bills are pushed by the rear plate 205 and the front plate 204, the support plate 209 supports the bill or bills and then the rear plate 205 is moved upward to release the push. While the rollers are not moved but remain in the position of clamping, excitation of the drive unit (not shown) is cancelled. Thereby, a bill or bills are clamped with an appropriate force whereby a user is made liable to pull out the bill or bills.

Further, after the inlet sensor 223 functioning as a pulling-out detection sensor detects that a user has pulled out the bill or bills, the rear plate 205 is moved to the position 205*a* to enlarge a space in the cash slot mechanism 20 to facilitate visual confirmation by a user even if conveyance in a bundle is not successfully made and a bill or bills, conveyance of which fails, remain in the cash slot.

In addition, a discharge position, to which a bill or bills are fed, may be fixed irrespective of sizes of a bill or bills as fed, or may be regulated according to a length or lengths of a bill or bills measured by a sensor, which is provided in the bill depositing/withdrawing apparatus to measure a length of a bill. Also, the discharge position may be regulated according to results of discrimination by the bill discriminator 30 at the time of money withdrawal.

Figure 13:
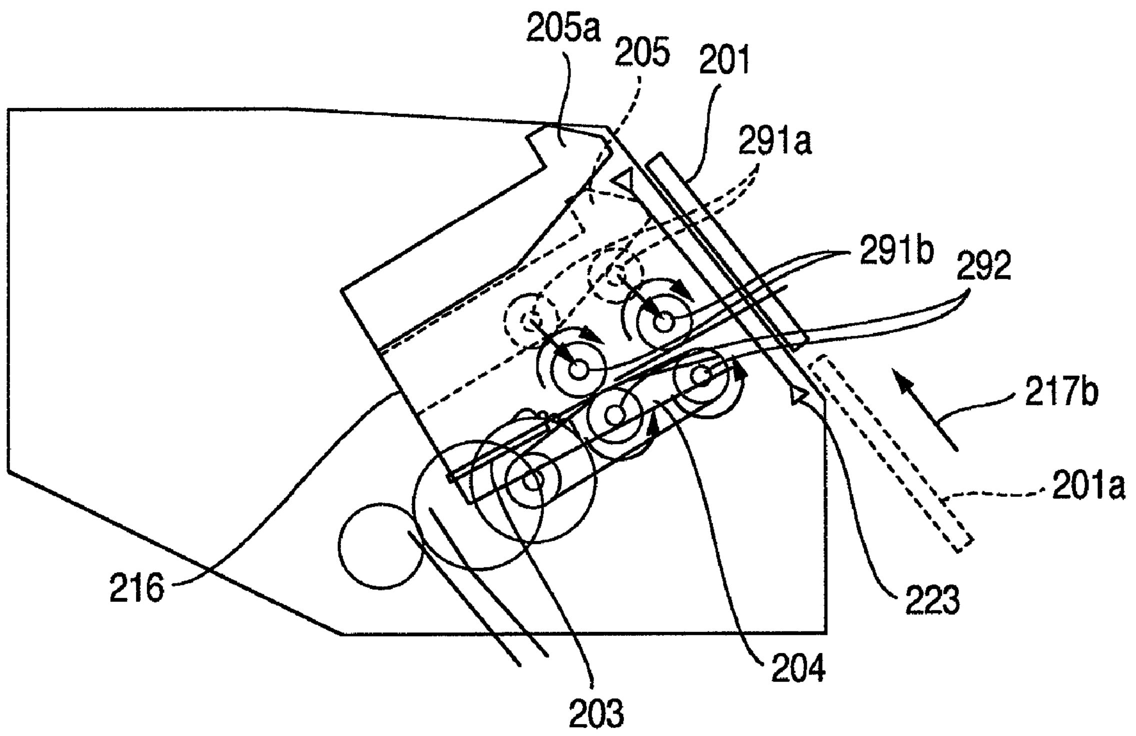
FIG. 13 is a side view of the cash slot mechanism at the time of recovery of a bill or bills as left.
Figure 14:
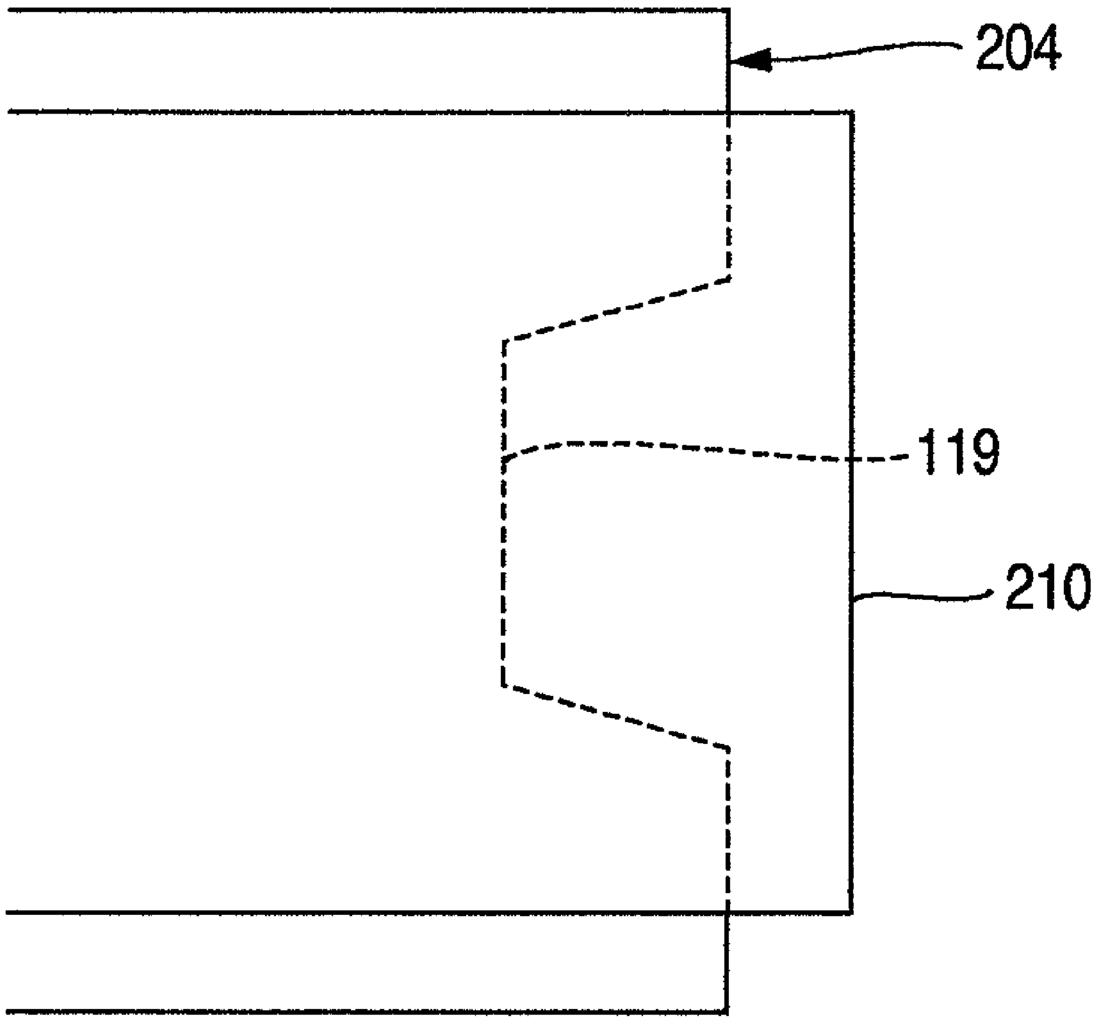
FIG. 14 is a plan view of a front plate of the cash slot mechanism.

If a user leaves a bill or bills at the time of money deposit or at the time of money withdrawal, the bill or bills as left are automatically recovered. At the time of recovery of a left bill or bills, in the case where a left bill or bills remain on the inlet sensor 223 as shown in FIG. 13, the upper rollers 291 are moved from the position 291*a* to a position on a bill surface 291*b* to clamp the bill or bills between it and the lower rollers 292, and the upper rollers 291 and the lower rollers 292 are rotated in reverse directions to directions at the time of discharge to store the bill or bills in the cash slot mechanism 20. After it is confirmed that any bill does not remain on the inlet sensor 223, the housing shutter 201 is moved in the direction of the arrow 217*b* and the shutter is closed. Also, a sensor (not shown) in the cash slot mechanism can readily detect a bill or bills possibly remaining on other parts.

After the housing shutter 201 is closed, the cash slot mechanism 20 is turned and moved from a position for the money depositing/withdrawing posture shown in FIG. 11 to a position for the feeding/stacking posture shown in FIG. 13. After the cash slot mechanism is turned and moved, a bill is fed by the rotating action of the feed roller 206 in the same manner as at the time of money deposit transaction and the gate roller 207, which does not rotate in the direction of discharge, prevents two bills from being fed at a time. Thus, a bill or bills 210 in the cash slot mechanism 20 are fed in the direction of the arrow 208 to merge into the bill conveyance path 50 to be taken into the apparatus to be stored in the retract box 61.

Subsequently, details of operation of the cash slot mechanism 20 in the money depositing/withdrawing transaction and in recovery of a bill or bills as left in the automated transaction machine will be described in order according to control flowcharts in FIGS. 15 to 18.

Figure 15:
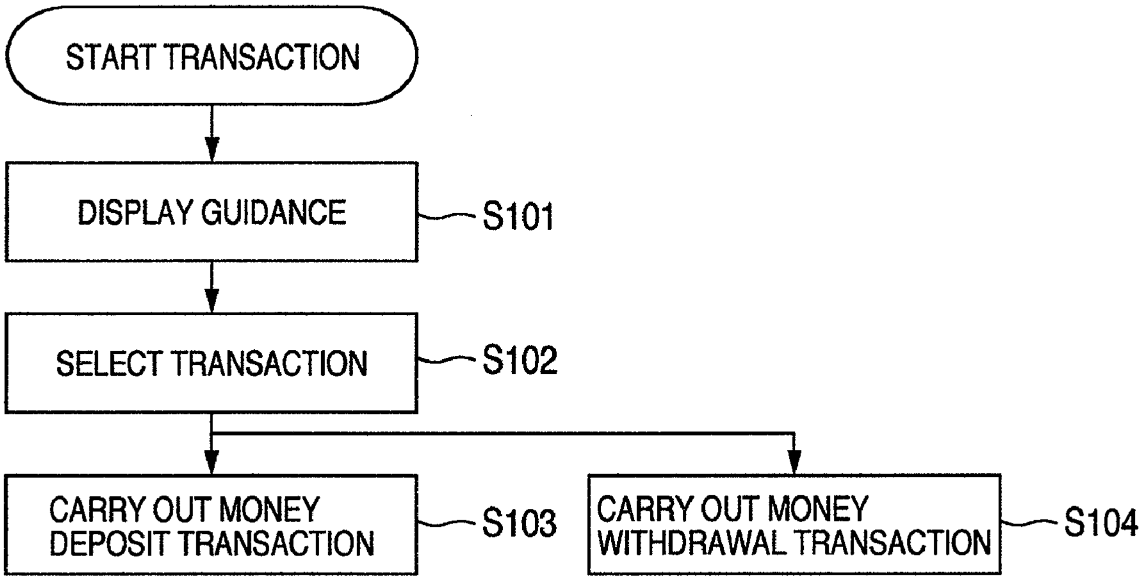
FIG. 15 is a flowchart at the time of selection of transaction.

FIG. 15 shows a flowchart when a user begins transaction and selects transaction.

The automated transaction machine 101 permits the customer operating unit 105 to display contents of transaction by way of guidance display (STEP S101).

When a user selects transaction (STEP S102), the automated transaction machine 101 carries out a money deposit transaction when a money deposit transaction is selected (STEP S103) and carries out a money withdrawal transaction when a money withdrawal transaction is selected (STEP S104).

Figure 16:
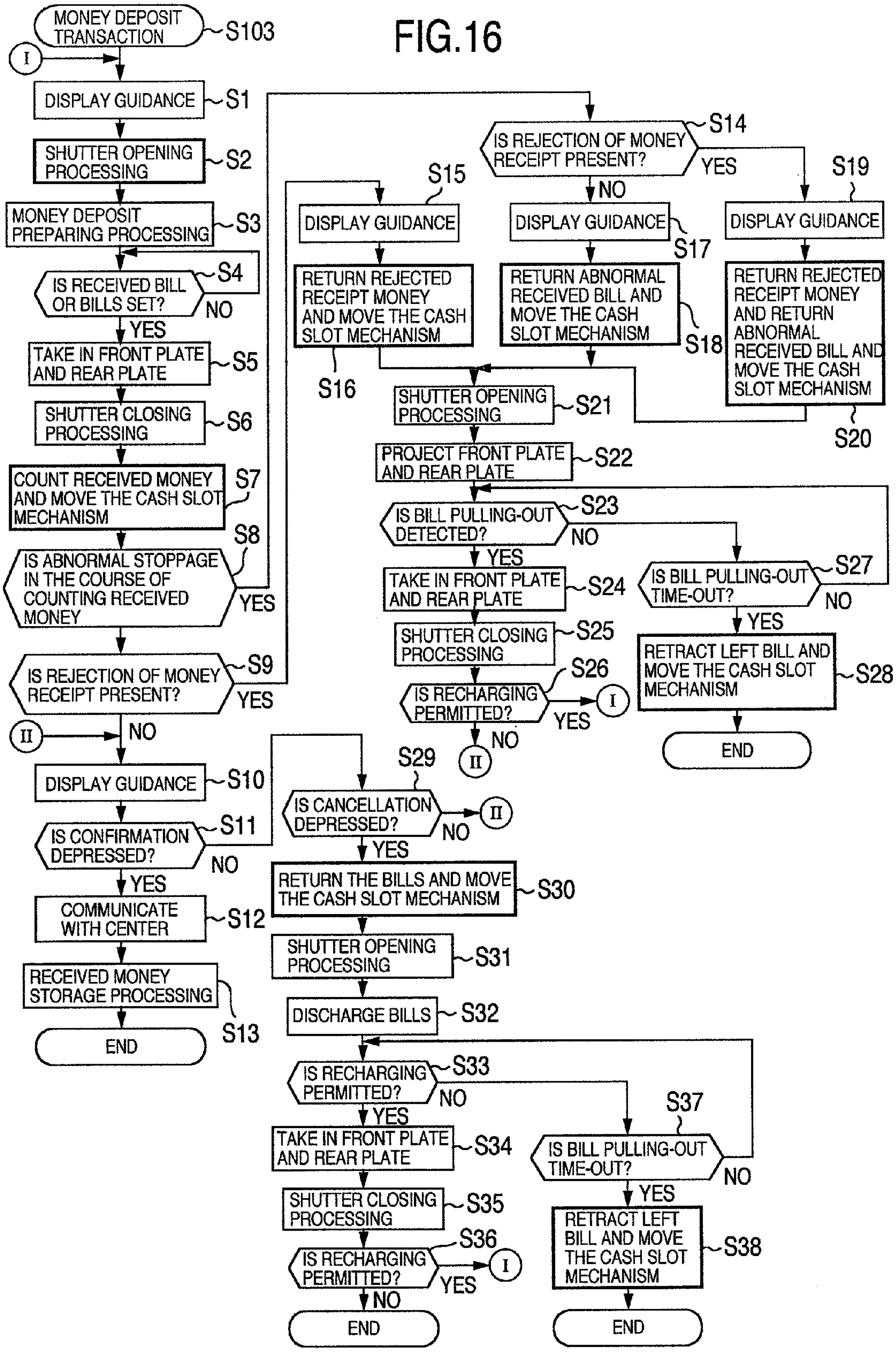
FIG. 16 is a flowchart of deposit transaction.
Figure 17:
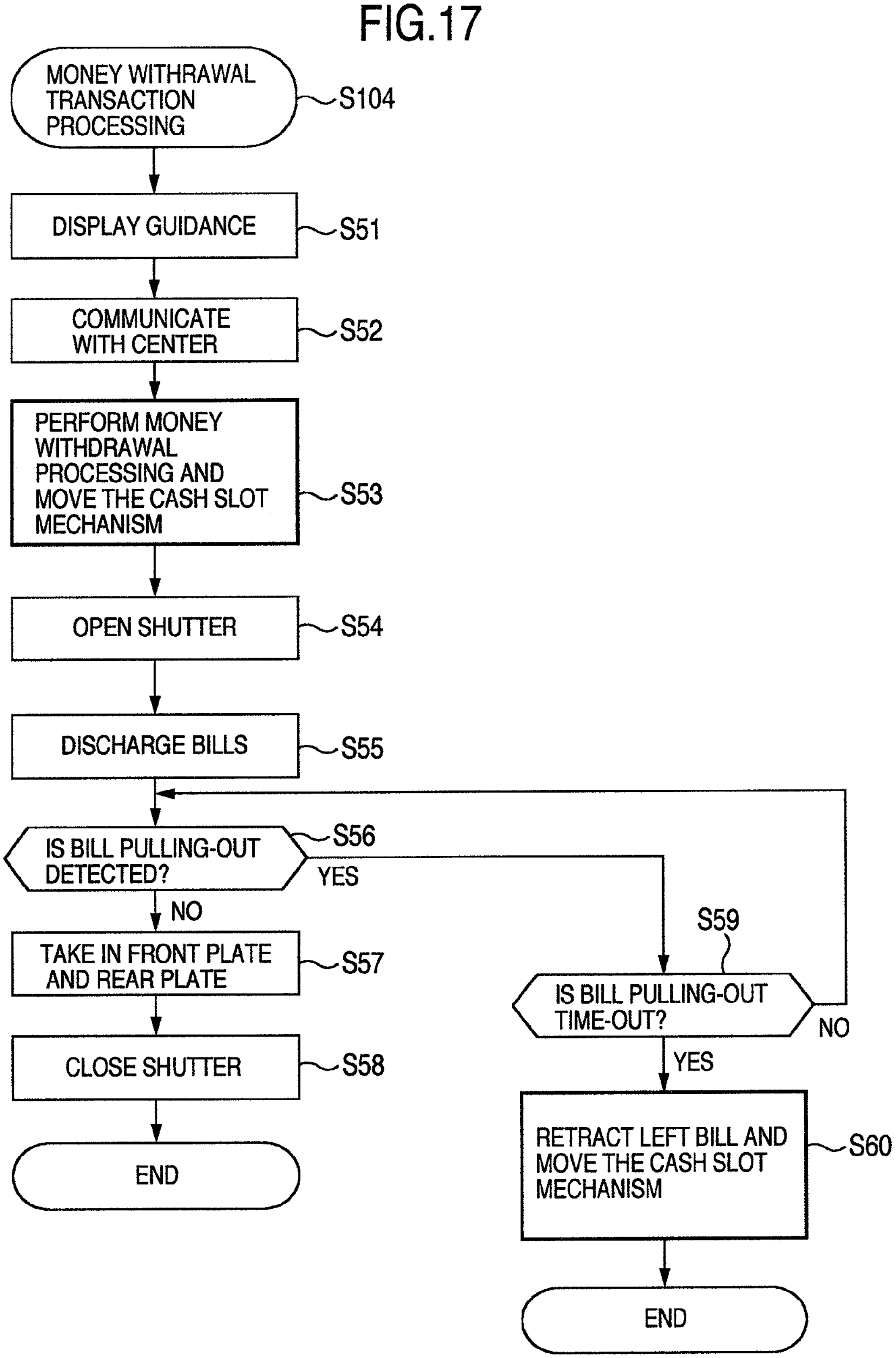
FIG. 17 is a flowchart of withdrawal transaction.
Figure 18:
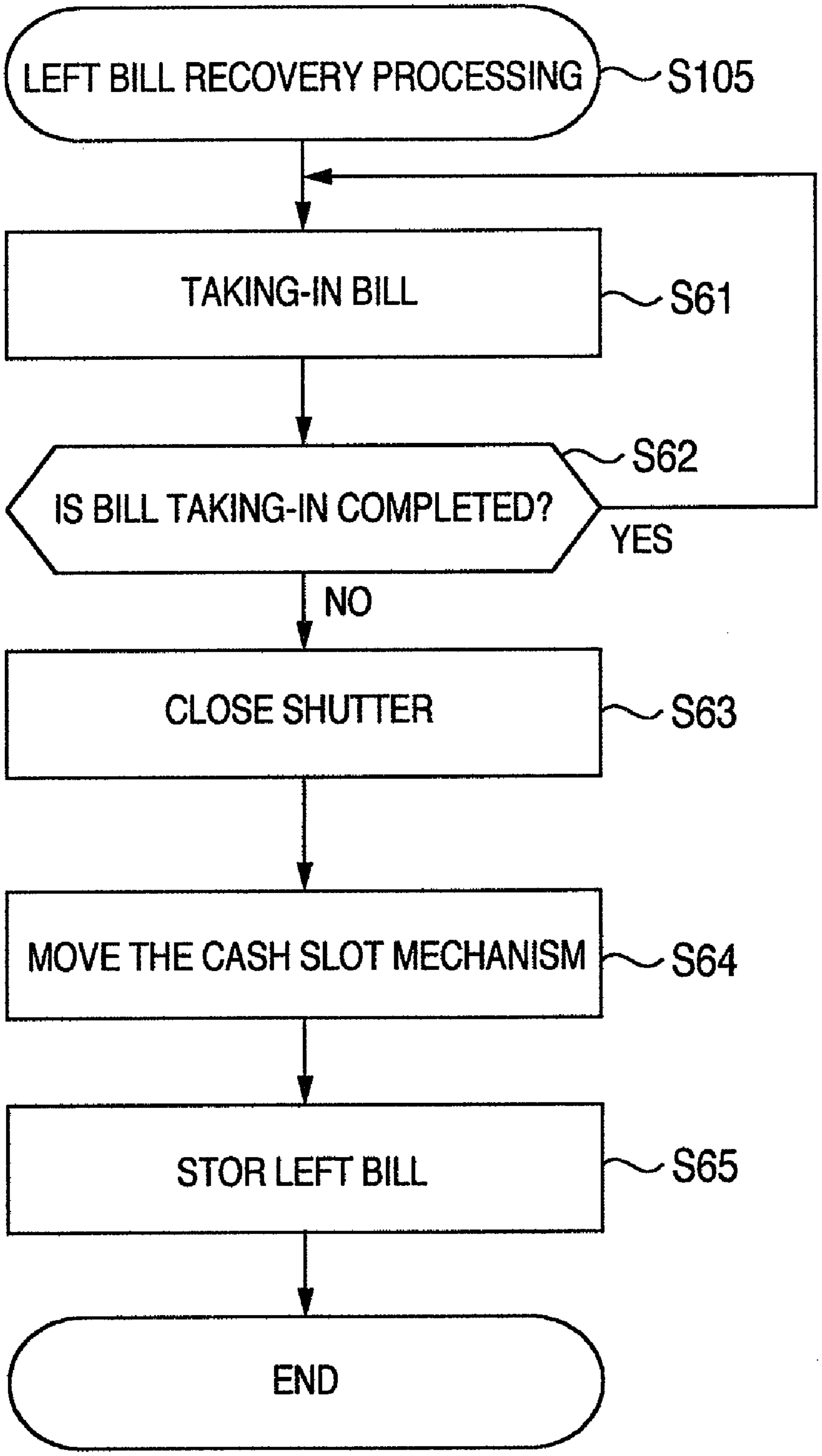
FIG. 18 is a flowchart of recovery of a bill or bills as left.

FIG. 16 shows a flowchart for the money deposit transaction and FIG. 17 shows a flowchart for the money withdrawal transaction. Processing in thick frames in FIGS. 16 and 17 are ones accompanied by moving action of the cash slot mechanism 20. FIG. 18 shows a flowchart for recovering or retracting a bill or bills as left.

As shown in FIG. 16, the bill depositing/withdrawing apparatus 1 for carrying out money deposit transaction displays guidance to show a limit of the number of received bills, etc. on the customer operating unit 105 (STEP S1). Subsequently, after the cash slot mechanism 20 is moved to the money depositing/withdrawing posture as shown in FIG. 6, a shutter opening processing is performed to open the housing shutter 201 (STEP S2), and a money deposit preparing processing is performed to cause the front plate 204 and the rear plate 205 to project toward a user through the opening 20*a* from the upper, front plate 101*a* (STEP S3) as shown in FIG. 7. The procedure is standby until a bill or bills being received are set in the cash slot mechanism 20 (STEP S4).

When a bill or bills are charged into the cash slot mechanism 20, the front plate 204 and the rear plate 205 are taken inside the opening 20*a* (STEP S5) and the housing shutter 201 is closed in the shutter closing processing (STEP S6).

In a received money counting processing, in which a bill or bills as received are counted, the cash slot mechanism 20 is moved to the feeding/stacking posture shown in FIG. 8 to perform actions of feeding and separating a bill or bills as received (STEP S7).

In the STEP S7, a bill or bills charged into the cash slot mechanism 20 are separated one by one and conveyed to the bill discriminator 30 to be subjected to discrimination of truth or falsehood of a bill, and a bill or bills, which are discriminated in the bill discriminator 30 to afford deposit, are once stored in the temporary stocker 40.

At this time, except a normal action, in which a bill or bills as received are all discriminated to afford deposit and are once stored in the temporary stocker 40, there are a case where discrimination is not possible in the bill discriminator 30 or inclination and an abnormal interval between bills causes rejection of deposit, and a bill or bills, deposit of which is rejected, are stored in the cash slot mechanism 20, and a case where detection of an abnormal bill or bills in separation of a bill or bills as received leads to abnormal stoppage in the course of counting of a bill or bills as received while a bill or bills as received are left in the cash slot mechanism 20.

When abnormal stoppage is caused in the course of counting of a bill or bills as received, presence of rejection of money deposit is discriminated and when rejection of money deposit is present (STEP S14: Y), a guidance is displayed (STEP S19) and a bill or bills, deposit of which is rejected, and an abnormal bill or bills are returned from the cash slot mechanism 20 (STEP S20). At this time, the cash slot mechanism 20 is changed to the money depositing/withdrawing posture from the feeding/stacking posture under a state, in which a bill or bills, deposit of which is rejected, and an abnormal bill or bills are stored in the storage space A of the cash slot mechanism 20.

When rejection of money deposit is absent in the STEP S14 (STEP S14: N), a guidance is displayed (STEP S17) and an abnormal bill or bills are returned from the cash slot mechanism 20 (STEP S18). At this time, the cash slot mechanism 20 is changed to the money depositing/withdrawing posture from the feeding/stacking posture under a state, in which an abnormal bill or bills are stored in the storage space A of the cash slot mechanism 20.

In the case where abnormal stoppage is not caused in the course of counting of a bill or bills as received in the STEP S8 (STEP S8: N) and rejection of money deposit is present (STEP S9: Y), a guidance is displayed (STEP S15) and a bill or bills, deposit of which is rejected, are returned from the cash slot mechanism 20 (STEP S16). At this time, the cash slot mechanism 20 is changed to the money depositing/withdrawing posture from the feeding/stacking posture under a state, in which a bill or bills, deposit of which is rejected, are stored in the storage space A of the cash slot mechanism 20.

In this manner, after the cash slot mechanism 20 is changed to the money depositing/withdrawing posture, the housing shutter 201 is opened in the shutter opening processing (STEP S21), the front plate 204 and the rear plate 205 are caused to project toward a user through the opening 20*a* from the upper, front plate 101*a* (STEP S22), and it is confirmed that a bill or bills are pulled out (STEP S23).

After it is confirmed that a bill or bills are pulled out (STEP S23: Y), the bill depositing/withdrawing apparatus 1 takes the front plate 204 and the rear plate 205 into the apparatus (STEP S24) and performs the shutter closing processing (STEP S25) to return a bill or bills, deposit of which is rejected, to a user.

After a bill or bills, deposit of which is rejected, and the like are returned, the procedure returns to a guidance processing in STEP S1 in case of accepting the received money counting processing again (STEP S26: Y), and the procedure proceeds to the guidance processing in STEP S10 in case of not accepting the received money counting processing (STEP S26: N).

In the case where pulling-out is not detected in the STEP S23 (STEP S23: N) and a predetermined period of time elapses (STEP S27: Y), it is determined that a bill or bills are left and a retracting processing is performed in order to continue a subsequent transaction (STEP S28).

In the case where an abnormal stoppage is not caused in the course of received money counting in the received money counting processing in STEP S7 (STEP S8: N) and rejection of money deposit is not generated (STEP S9: N), a guidance for the number of bills counted in the received money counting processing in STEP S7 is displayed on the customer operating unit 105 (STEP S10). When a user confirms (depress a confirmation button) an amount of money as received (STEP S11: Y), center communication is performed (STEP S12) and a money deposit transaction is settled to perform a received money storage processing (STEP S13), thus terminating the money deposit transaction. In the received money storage processing (STEP S13), the bill discriminator 30 again discriminates information of a kind of a bill for a bill or bills in the temporary stocker 40 and a processing is performed to store the bill or bills in either of the money deposit box 60 and the recycle boxes 80.

In the case where a user does not confirm acknowledgement of an amount of money as received (STEP S11: N) but selects cancellation of money deposit (STEP S29: Y), a cancellation return processing, in which a bill or bills in the temporary stocker 40 are stored in the cash slot mechanism 20, is performed (STEP S30). Thereafter, the shutter opening processing is performed (STEP S21) and the bill discharge processing is performed projecting the front plate 204 and the rear plate 205 toward a user through the opening 20*a* from the upper, front plate 101*a* (STEP S32). When it is confirmed that a bill or bills are pulled out (STEP S33: Y), the front plate 204 and the rear plate 205 are taken into the apparatus (STEP S34) and the shutter closing processing is performed (STEP S35) to complete returning a bill or bills as received to a user.

In the case where recharging is permitted (STEP S36: Y), the procedure returns to the guidance processing in STEP S1, and in the case where recharging is not permitted (STEP S36: N), the money deposit transaction is terminated.

In the case where a user does not pull out a bill or bills for a predetermined period of time or longer in the STEP S33 (STEP S37: Y), it is determined that a bill or bills are left and the retract processing (STEP S38) is performed in order to continue a subsequent transaction.

FIG. 17 is a flowchart illustrating a money withdrawal transaction processing. The bill depositing/withdrawing apparatus 1, which carries out a money withdrawal transaction, instructs a user to input a password, an amount of money being paid, etc. by way of guidance display (STEP S51) and receives, through center communication, instructions to carry out a transaction of contents as input (STEP S52), thus starting the money withdrawal processing (STEP S53). In the money withdrawal processing, a kind of a bill for a bill or bills fed a predetermined number by a predetermined number from the money withdrawal boxes 70 and the recycle boxes 80 is discriminated every kind of bill by the bill discriminator 30 and the bill or bills are stored in a bundle in the storage space A, which assumes the feeding/stacking posture (FIG. 9). Under a state, in which a bill or bills as paid are stored in the storage space A, the bill depositing/withdrawing apparatus 1 changes the cash slot mechanism 20 to the money depositing/withdrawing posture from the feeding/stacking posture (FIGS. 10 and 11).

The bill depositing/withdrawing apparatus 1 performs the shutter opening processing (STEP S54) and has the bundle conveyance mechanism feed a bill or bills to a user (STEP S55) as shown in FIG. 12. At this time, the front plate 204 and the rear plate 205 are caused to project toward a user through the opening 20*a* from the upper, front plate 101*a* and excitation of driving means (for example, a solenoid) is made OFF to facilitate pulling out a bill or bills.

When pulling out a bill or bills is detected (STEP S56: Y), the bill depositing/withdrawing apparatus 1 takes the front plate 204 and the rear plate 205 into the upper, front plate 101*a* (STEP S57) and performs the shutter closing processing (STEP S58).

In the case where a user does not pull out a bill or bills for a predetermined period of time or longer (STEP S56: N, STEP S59: Y), it is determined that a bill or bills are left and the retract processing (STEP S60) described with reference to FIG. 18 is performed in order to store the left bill or bills in a bundle in the retract box 61 and continue a subsequent transaction.

FIG. 18 is a flowchart illustrating the retract processing.

In the case where a user does not pull out a bill or bills for a predetermined period of time or longer in returning a bill or bills, deposit of which is rejected, canceling and returning, leaving a bill or bills being paid, or the like, it is determined that a bill or bills are left and the retract processing is performed in order to continue a subsequent transaction.

Here, when it is detected that a bill or bills are left, the front plate 204 is vibrated and moved a little.

Since a bill or bills as left move a little due to the vibration of the front plate 204, detection by the sensor can be made sure. Thereby, an erroneous detection is prevented, in which a bill or bills are not detected by the sensor although a bill or bills are left.

The bill depositing/withdrawing apparatus 1 takes the front plate 204 and the rear plate 205 into the apparatus whereby a bill or bills, which are fed but not pulled out, are stored in the cash slot mechanism 20 (STEP S61). When taking-in of a bill or bills is completed (STEP S62: Y), the bill depositing/withdrawing apparatus 1 performs the shutter closing processing (STEP S63). After the shutter closing processing, the bill depositing/withdrawing apparatus 1 changes the posture of the cash slot mechanism 20 to the feeding/stacking posture (STEP S64) to discharge a bill or bills from the cash slot mechanism 20 to store the same in the retract box 61.

According to the embodiment described above, when a bill or bills are charged, a user can perform an operation of money deposit without feeling a fear in inserting a hand into the cash slot 21 having a drive unit. That is, since it suffices to charge a bill or bills between the front plate 204 and the rear plate 205, which project toward a user from the cash slot 21, a user's psychological sense is not a sense of inserting a hand into the apparatus but a sense of charging a bill or bills into a slot outside the apparatus. Therefore, a user can perform an operation of charging a bill or bills feeling psychologically at rest without a psychological feeling of fear.

Also, a user making use of a wheelchair does not need inserting a hand deep into the cash slot but suffices to charge a bill or bills between the front plate 204 and the rear plate 205, which project, so that a distance to a position of money deposit becomes small, thus enabling an improvement in operability.

Also, in case of foreign bills, which are considerably different in size every kind of bill, bills are unevenly aligned in some cases when they are charged in a laid posture, the invention enables a change of posture to the feeding/stacking posture to turn and move a bill or bills, which are charged in a laid posture into the cash slot mechanism 20 in a money depositing/withdrawing posture, thus enabling the bill or bills to be changed to an upright posture. Thereby, uneven alignment of ends of bills is corrected owing to the effect of gravity, thus enabling decreasing an abnormality in conveyance, such as jam of bills, etc. Besides, a simple construction can be realized at low cost by making use of gravity in correction of uneven alignment.

Also, when a bill or bills are to be fed, it is possible to clamp the bill or bills to discharge the same in a bundle to a user. At this time, the bill or bills are pushed out toward a user from the front of the housing 101*b*. Thereby, in that operation, in which a user receives a bill or bills, there is produced the same effect as at the time of charging that a psychological feeling of fear is absent and even a user making use of a wheelchair can receive a bill or bills easily.

Also, since a bill or bills are clamped between the front plate 204 and the rear plate 205 at the time of bill discharge, a bill or bills are not scattered even in the case where the apparatus is mounted outdoor and a strong wind blows, thus enabling surely delivering a bill or bills to a user.

Also, since the front plate 204 supports a bottom of a bill or bottoms of bills at the time of bill discharge, the front plate 204 serves as a saucer to make a user liable to receive a bill or bills.

Also, even if conveyance in a bundle is not successful and a bill or bills, conveyance of which fails, remain in the cash slot 21, the rear plate 205 as a push plate, which constitutes the cash slot mechanism 20, is moved to enlarge an interior of the cash slot mechanism 20 to make the storage space A easy to see, thus making a user liable to make visual confirmation to enable preventing a bill or bills from being left.

Also, in the case where a bill or bills as left are present, the sensor in the cash slot 21 can readily detect the bill or bills as left, which can be retracted intact by the bundle conveyance mechanism. Thereby, it is possible for the apparatus to continue a subsequent transaction without becoming down.

In this manner, the bill depositing/withdrawing apparatus 1 described above can realize a bill depositing/withdrawing apparatus, in which jam in conveyance and leaving a bill or bills are decreased and which has a user friendly money depositing/withdrawing interface and is high in reliability.

Figure 19:
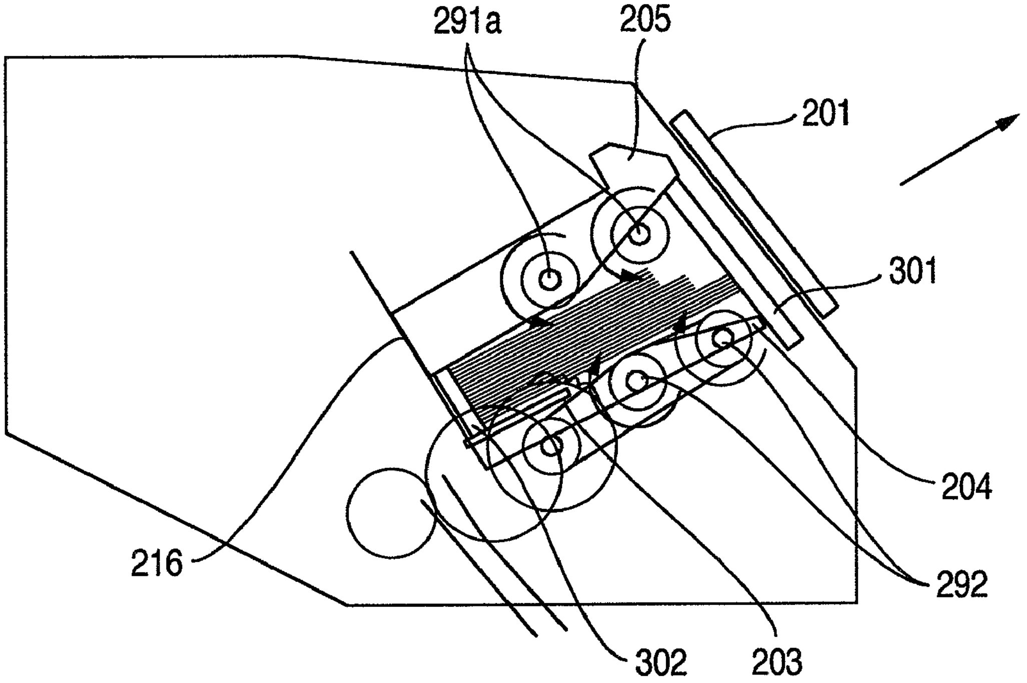
FIG. 19 is a side view of a cash slot mechanism according to another embodiment of the invention.
Figure 20:
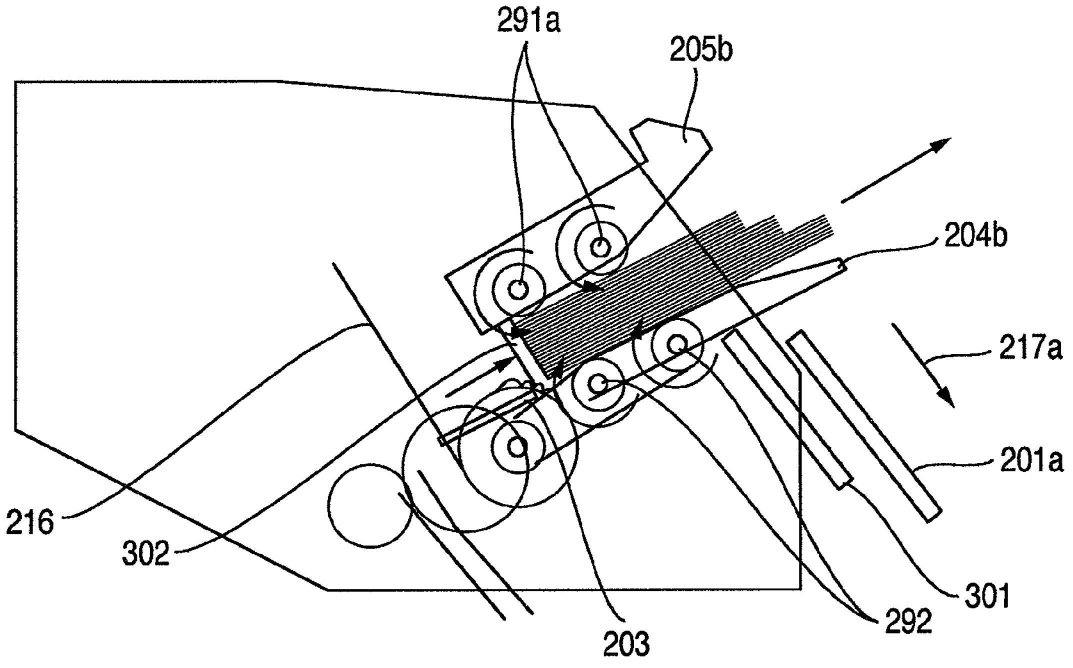
FIG. 20 is a side view of a cash slot mechanism according to another embodiment.

In addition, according to another embodiment, an inner shutter 301 as an opening and closing shutter may be provided on the cash slot mechanism 20 as in a configuration of the cash slot mechanism 20 shown in FIGS. 19 and 20. The inner shutter 301 has a length from the tip end of the front plate 204 to the tip end of the rear plate 205, and slidingly moves in parallel to the housing shutter 201 from a position, in which the opening of the storage space A is covered as shown in FIG. 19, to a position, in which the opening of the storage space A is opened as shown in FIG. 20. Also, the inner shutter 301 is mounted to the cash slot mechanism 20 to turn and move with the cash slot mechanism 20 when the cash slot mechanism 20 turns and moves changing in posture between the money depositing/withdrawing posture and the feeding/stacking posture. The inner shutter 301 is structured to make an opening and closing action simultaneously with an opening and closing action of the housing shutter 201.

Thereby, when the cash slot mechanism 20 is changed in posture for the money deposit processing and the money withdrawal processing, the inner shutter 301 is put in a closed state, thus enabling preventing a centrifugal force in turning at the time of change in posture from causing a bill or bills 210 to spring from the storage space A and from unbalancing bills, which are unevenly set about the opening, to make the same scatter in the apparatus.

Also, when the inner shutter 301 is not closed after a bill or bills are charged in the money deposit processing, it is preferable to open the inner shutter 301 and the housing shutter 201 to return a bill or bills 210. At this time, preferably, the customer operating unit 105 or the like invites a user to align and recharge a bill or bills. Thereby, it is possible to prevent the money deposit processing from being carried out in a state, in which the inner shutter 301 is not fully closed.

Also, a stopper 302 shown in FIGS. 19 and 20 may be provided on the cash slot mechanism 20 in place of the support plate 209 (see FIG. 7). Preferably, the stopper 302 is mounted to the cash slot mechanism 20 to function as a bottom plate in the innermost of the storage space A and to slidingly move toward this side (tip ends of the front plate 204 and the rear plate 205) from the innermost of the storage space A (bases of the front plate 204 and the rear plate 205). Preferably, the stopper slidingly moves interlocking with the front plate 204 and the rear plate 205 over the same distance as that of the latter.

Thereby, it is possible to surely push a bill or bills 210 toward a user when the bill or bills 210 are to be fed in the money deposit processing, so that a user can take out the bill or bills 210 easily. Also, when charging of a bill or bills is permitted in the money deposit processing, the stopper 302 can prevent a bill or bills 210 from entering the innermost of the storage space A, so that a user enables use psychologically at rest without the need of inserting a hand into the apparatus.

Also, a structure may be employed that when the inner shutter 301 is not closed at the time of bill charging, the closing action of the inner shutter 301 is retried performing an action, in which the inner shutter 301 is caused to swingably act to knock off a bill or bills inside and the stopper 302 and the front plate 204 are moved to vibrate a bill or bills to make the same slide inside. Thereby, it is possible to restrict times of urging recharging in a state, in which the inner shutter 301 is not fully closed.

The invention is not limited to the construction of the embodiment described above but many embodiments are obtainable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A bill depositing/withdrawing apparatus which is provided in an ATM having a cash slot for charging/discharging a bill or bills, comprising:

- a bill storage section including a moveable portion that supports at least a portion of a bill or bills and is provided inwardly of the cash slot;
- a posture changing portion that changes the bill storage section between:
  - a money depositing/withdrawing posture in which a bill or bills are received from, or paid to, a user through the cash slot, and
  - a feeding/stacking posture in which a bill or bills are fed into the apparatus and stacked in the bill storage section;
- wherein during a money charging operation, the posture changing portion changes the bill storage section to the money depositing/withdrawing posture, and receives the charged bill or charged bills from the user, wherein, during receiving of the charged bill or bills, the bill storage section clamps the charged bill or bills with the clamping portion such that a part of the clamping portion and upper ends of the charged bill or changed bills placed in the bill storage section project outwardly from the cash slot toward the user, and the bill storage section takes the charged bill or charged bills into the bill storage section; and
- wherein, during a money discharging operation, the posture changing portion changes the bill storage section to the money depositing/withdrawing posture, and then the bill storage section clamps the bill or bills to be discharged with the clamping portion such that a part of the clamping portion and upper ends of the bill or bills to be discharged project from the cash slot toward the user.

2. The bill depositing/withdrawing apparatus according to claim 1, wherein the clamping means includes at least one movable plate.

3. The bill depositing/withdrawing apparatus according to claim 1, further comprising:

- a bill feeding portion that feeds a bill or bills into the apparatus from the bill storage section in the feeding/stacking posture.

4. The bill depositing/withdrawing apparatus according to claim 1, wherein the clamping portion comprises an excess charging detection portion that detects whether a charged bill or bills are excessively packed.

5. The bill depositing/withdrawing apparatus according to claim 1, wherein the clamping portion clamps a charged bill or bills in the money depositing/withdrawing posture, and the apparatus further comprises an intermittent moving portion that intermittently moves the clamping portion, which has clamped the bill or bills, into the apparatus from the projected position, in order to take in the bill or bills.

6. The bill depositing/withdrawing apparatus according to claim 1, further comprising drive rollers that rotate to drive a bill or bills so as to project at least in part outside the cash slot.

7. The bill depositing/withdrawing apparatus according to claim 6, wherein the drive rollers are arranged in opposition to each other so as to clamp a bill or bills, and when discharging to rotate to drive the bill or bills so as to project at least in part outside the cash slot, while pushing the bill or bills from both sides thereof.

8. The bill depositing/withdrawing apparatus according to claim 1, further comprising an opening and closing shutter provided on a side of the bill storage section toward the cash slot, the cash slot including a housing shutter.

9. The bill depositing/withdrawing apparatus according to claim 1, further comprising at least one of a stopper and a support plate provided in the bill storage section, the at least one of a stopper and a support plate being movable in the money depositing/withdrawing posture in at least one of a direction toward the cash slot and a direction perpendicular to the direction toward the cash slot.

10. The bill depositing/withdrawing apparatus according to claim 9, wherein the at least one of a support plate and a stopper supports a lower end of the clamped and projected bill or bills during money charging and discharging.

11. A method of controlling a bill depositing/withdrawing apparatus which is provided in an ATM having a cash slot for charging/discharging a bill or bills, the method comprising, in a money charging processing, the steps of:

- placing a bill or bills to be charged into a clamping portion of a bill storage section, wherein the bill storage section is in a money depositing/withdrawing posture;
- clamping the bill or bills to be charged such that a part of the clamping portion and upper ends of the charged bill or charged bills placed in the bill storage section project outwardly from the cash slot toward a user;

moving the clamping portion inside the apparatus in order to take in the bill or bills;

changing posture of the bill storage section to feeding/stacking posture, in which the bill or bills as taken in are fed into and stacked in the apparatus; and feeding the bill or bills into the apparatus from the bill storage section in the feeding/stacking posture.

12. The method according to claim 11, further comprising:

excess charging detection during clamping, by detecting whether a charged bill is excessively packed or charged bills are excessively packed.

13. The method according to claim 11, further comprising:

moving at least one of a support plate and a stopper provided in the bill storage section, which supports a lower end or lower ends of the bill or bills, when changing posture of the bill storage section, the at least one of a stopper and a support plate being movable in the money depositing/withdrawing posture in at least one of a direction toward the cash slot and a direction perpendicular to the direction toward the cash slot.

14. A method of controlling a bill depositing/withdrawing apparatus which is provided in an ATM having a cash slot for charging/discharging a bill or bills, the method comprising, in a money discharging processing, the steps of:

stacking a bill or bills, present in the apparatus, into a bill storage section in feeding/stacking posture;

changing posture of the bill storage section to money depositing/withdrawing posture from the feeding/stacking posture;

causing the clamping portion of the bill storage section, as a result of at least one of a motion of the clamping portion and a motion of a support plate, to clamp the bill or bills to be discharged such that a part of the clamping portion and upper ends of the bill or bill to be discharged project outwardly from the cash slot toward a user, thereby permitting the bill or bills to be taken out.

15. The method according to claim 14, further comprising a step of detecting a length or lengths of a bill or bills, which are stacked in the bill storage section in the stacking step, in a taking-out permitting direction, and wherein the posture changing step in the money discharging processing includes a step of regulating a distance or distances, over which the bill or bills in the money depositing/withdrawing posture project at least in part outside the apparatus, according to the length or lengths of the bill or bills, which are detected in the detection step, in a bill taking-out direction.

16. The method according to claim 14, further comprising a step of detecting a kind or kinds of a bill or bills stacked in the bill storage section in the stacking step, and wherein the posture changing step in the money discharging processing includes a step of regulating a distance or distances, over which the bill or bills in the money depositing/withdrawing posture project at least in part outside the apparatus, according to the kind or kinds of the bill or bills detected in the detecting step.

17. The method according to claim 14, further comprising:

clamping the bill or bills by means of the moveable portion of bill storage section;

causing the moveable portion of bill storage section and the bill or bills to project, at least in part, outside the apparatus from the cash slot; and releasing the clamping portion to permit the bill or bills to be taken out.

18. The method according to claim 14, further comprising:

excess charging detection during clamping, by detecting whether a charged bill is excessively packed or charged bills are excessively packed.

19. The method according to claim 14, further comprising:

moving at least one of a support plate and a stopper provided in the bill storage section, which supports a lower end or lower ends of the bill or bills, when changing posture of the bill storage section, the at least one of a stopper and a support plate being movable in the money depositing/withdrawing posture in at least one of a direction toward the cash slot and a direction perpendicular to the direction toward the cash slot.

* * * * *